(12) United States Patent
Bergquist

(10) Patent No.: US 9,894,706 B2
(45) Date of Patent: Feb. 13, 2018

(54) TOGGLING DISCONTINUOUS RECEPTION IN WIRELESS COMMUNICATIONS

(71) Applicant: Telefonaktiebolaget L M Ericsson (publ), Stockholm (SE)

(72) Inventor: Gunnar Bergquist, Kista (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 16 days.

(21) Appl. No.: 14/715,885

(22) Filed: May 19, 2015

(65) Prior Publication Data

US 2016/0345379 A1 Nov. 24, 2016

(51) Int. Cl.
*H04W 76/04* (2009.01)
*H04W 36/00* (2009.01)
*H04W 36/30* (2009.01)
*H04W 36/08* (2009.01)

(52) U.S. Cl.
CPC .......... *H04W 76/048* (2013.01); *H04W 36/08* (2013.01)

(58) Field of Classification Search
CPC ........... H04W 76/048; H04W 36/0088; H04W 36/30
See application file for complete search history.

(56) References Cited

U.S. PATENT DOCUMENTS

| | | | | |
|---|---|---|---|---|
| 2008/0090573 A1* | 4/2008 | Kim | ...................... | H04W 36/08 455/436 |
| 2012/0009928 A1* | 1/2012 | Wu | ...................... | H04W 76/048 455/436 |
| 2013/0229931 A1* | 9/2013 | Kim | ...................... | H04W 24/10 370/252 |

(Continued)

FOREIGN PATENT DOCUMENTS

| | | |
|---|---|---|
| EP | 1 986 458 A1 | 10/2008 |
| WO | WO 2013/017929 A1 | 2/2013 |
| WO | WO 2013/035984 A1 | 3/2013 |

OTHER PUBLICATIONS

Ericsson et al. "Further discussion on UE-supported DRX configuration" 3GPP Draft TSG_RAN WG2 90 77bis 7.2.1 (4 pages) (Mar. 26-30, 2012).

(Continued)

*Primary Examiner* — Kamran Afshar
*Assistant Examiner* — Minjung Kim
(74) *Attorney, Agent, or Firm* — Sage Patent Group

(57) ABSTRACT

A method by a user equipment node (UE) is disclosed for discontinuous reception (DRX) of traffic from a source radio access network (S-RAN) node of a telecommunications system. The method includes determining whether a condition occurred that can trigger initiation of handover to a target RAN (T-RAN) node. Based on determining the condition has not occurred, a selection is made among a plurality of service-specific DRX configurations based on a service type of the traffic from the S-RAN node, and DRX by the UE of traffic from the S-RAN node is controlled based on the selected service-specific DRX configuration. Based on determining the condition has occurred, DRX by the UE of traffic from the S-RAN node is controlled based on a service-agnostic DRX configuration that is agnostic to the service type of the traffic from the S-RAN node. Related UEs, methods by a RANs, and RANs are disclosed.

20 Claims, 14 Drawing Sheets

(56) References Cited

U.S. PATENT DOCUMENTS

2014/0194125 A1* 7/2014 Wen .................. H04W 36/0088
                                                    455/437
2014/0247742 A1* 9/2014 Lee ................... H04W 52/0216
                                                    370/252
2015/0085712 A1* 3/2015 Wang ................. H04W 76/048
                                                    370/280

OTHER PUBLICATIONS

International Search Report corresponding to International Patent Application No. PCT/EP2015/060944 (5 pages) (dated Feb. 25, 2016).

3GPP, Technical Specification, "3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0 (Dec. 2010), 53 pp.

3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.0.0 (Dec. 2010), 276 pp.

* cited by examiner

Handover Preparation, drx-InactivityTimer is Running

Case D-SR: The UE sends a Measurement Report, drx-InactivityTimer is (re)started

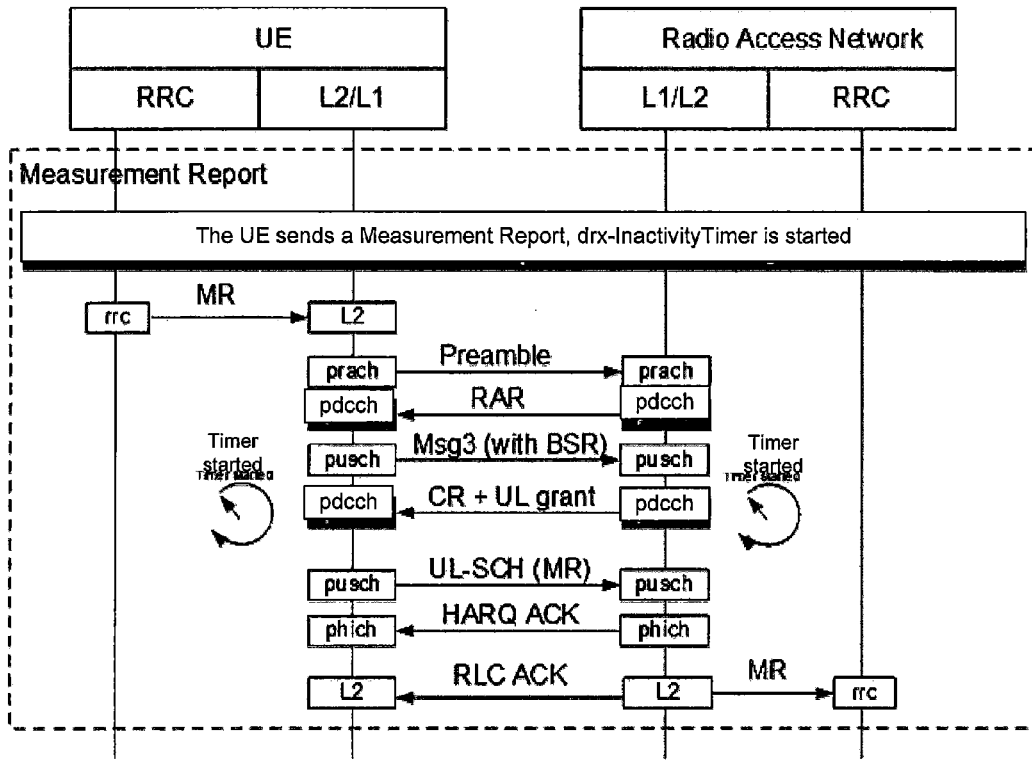

Case RA-SR: The UE sends a Measurement Report, drx-InactivityTimer is started

FIGURE 3

```
DRX-Config ::=        CHOICE {
    release               NULL,
    setup                 SEQUENCE {
        onDurationTimer       ENUMERATED {
                                  psf1, psf2, psf3, psf4, psf5, psf6,
                                  psf8, psf10, psf20, psf30, psf40,
                                  psf50, psf60, psf80, psf100,
                                  psf200},
        drx-InactivityTimer   ENUMERATED {
                                  psf1, psf2, psf3, psf4, psf5, psf6,
                                  psf8, psf10, psf20, psf30, psf40,
                                  psf50, psf60, psf80, psf100,
                                  psf200, psf300, psf500, psf750,
                                  psf1280, psf1920, psf2560, psf0-v1020,
                                  spare9, spare8, spare7, spare6,
                                  spare5, spare4, spare3, spare2,
                                  spare1},
```

DRX-Config in 3GPP TS 36.331 E-UTRA RRC Radio Resource Control

FIGURE 4

Handover preparation, drx-InactivityTimer is running

Handover preparation, drx-InactivityTimer expires ahead of time

Explicit: Use current standard procedures to suspend service-specific DRX

Explicit: use lightweight MAC to suspend service-specific DRX

SWITCH message

PMB = SWITCH (based on Figure 2): Triggers 1, 2, 3 for SWITCH.

Implicit: use event-triggered suspension of service-specific DRX

Based on determining that another condition has occurred based on completing handover to the T-RAN node, cease control of DRX by the UE based on the service-agnostic DRX configuration and select among a plurality of service-specific DRX configurations based on characteristics of traffic from the T-RAN node to use to control DRX by the UE — 1600

FIGURE 16

Determine that the condition has occurred based on receiving a control message from the S-RAN node, the control message containing DRX configuration data — 1700

Define a parameter of the service-agnostic DRX configuration based on the DRX configuration data — 1702

FIGURE 17

Determine that an entering condition has occurred for triggering reporting of measurements to the S-RAN node — 1800

Initiate reporting of measurements to the S-RAN node, where at least one of the reports contains a request for the S-RAN node to suspend the UE's use of the service-specific DRX configurations — 1802

Receive a message from the S-RAN node controlling the UE to suspend the selecting among the plurality of service-specific DRX configurations irrespective of any changes in a service type of the traffic from the S-RAN node — 1804

TOGGLING DISCONTINUOUS RECEPTION IN WIRELESS COMMUNICATIONS

TECHNICAL FIELD

The present disclosure is directed to communications systems and, more particularly, methods, network nodes, user equipment nodes, and systems for discontinuous reception in wireless communications systems.

BACKGROUND

In a 3GPP Long Term Evolution (LTE) network architecture, handover of a User Equipment node (UE) takes place between Evolved NodeBs (eNBs). A eNB where a User Equipment (UE) is currently located is called a Source eNB (S-eNB). A eNB to which the UE is handed over is called a Target eNB (T-eNB). Handover is a process of handing over the UE from a cell controlled by the S-eNB to a cell controlled by the T-eNB.

FIG. 1 illustrates operations and sequences of messages performed by components of a telecommunications system for handover. Referring to FIG. 1, as a user equipment node (UE) moves into the coverage area of a cell in the T-eNB, it sends a Measurement Report. The Measurement Report triggers a sequence of handover related events by the T-eNB, the S-eNB, and the core network and eventually further involves the UE for handover.

In order to transmit a measurement report over an uplink shared (UL-SCH) channel, the UE must have Physical Uplink Shared Channel (PUSCH) resources. For that purpose the UE reports its buffer status by a buffer status report (BSR). The UE begins by first sending a Scheduling Request.

FIG. 2 illustrates operations and messaging between a UE and S-eNB of a radio access network for sending measurement reports in preparation for handover, and illustrates when a drx-InactivityTimer is started and restarted. The sequence of events in FIG. 2 includes the UE sending a dedicated scheduling request (D-SR) on a Physical Uplink Control Channel (PUCCH). The UE then remains discontinuous reception (DRX) Active, i.e. continuously receiving, while the SR is pending, i.e. until the UE receives a grant on PUSCH or, whichever occurs first, until the UE exhausts a maximum number of attempts (not shown). The UE receives the UL grant and starts a drx-InactivityTimer to further prolong the DRX Active Time. The UE uses the UL grant in accordance with standardized priorities and logical channel prioritization. The BSR describes the size of each buffer in the UE and has highest priority. The radio access network acknowledges the data received on UL-SCH and grants in accordance with the BSR. Once again; the drx-Inactivity-Timer is started (or restarted). The size of the grant is now large enough for the UE to include the Measurement Report. The sequence ends as orchestrated by the L1/L2 layers of the network, with the UE acknowledging data received and passing the data onwards to its RRC layers. The UE starts (or restarts) the drx-InactivityTimer each time the Physical Downlink Control Channel (PDCCH) indicates a new transmission (DL or UL).

As used herein, the term "Active Time" can be the time related to DRX operation, such as defined in subclause 5.7 of 3GPP TS 36.321, during which the MAC entity monitors the PDCCH. The term "DRX Cycle" can be the periodic repetition of the On Duration followed by a possible period of inactivity. The term "drx-InactivityTimer" can be the number of consecutive PDCCH-subframe(s) after the subframe in which a PDCCH indicates an initial UL, DL or SL user data transmission for this MAC entity.

There is also a case when PUCCH has not been provisioned, where instead the UE must first use the random access procedure to resynchronize by sending a Random Access SR (RA-SR).

FIG. 3 illustrates operations and messaging between a UE and S-eNB of a radio access network for sending measurement reports in preparation for handover, and illustrates starting of a drx-InactivityTimer. The illustrated sequence of events is similar to that of D-SR. In both cases, the Active Time is limited by the drx-InactivityTimer. This timer has been pre-configured by RRC using the current values. FIG. 4 illustrates an example DRX-configuration data structure according to 3GPP TS 36.331 E-UTRA RRC.

A goal of DRX is to conserve battery energy in the UE, including by providing the briefest possible phases of receive Active time when a UE is configured to receive from an eNB. Handover is essential for retainability in a mobile communication network. Handover is usually performed at radio coverage borders and requires as good communication path as possible so that the Handover procedures can be performed quickly and reliably. For this purpose, handover procedures need longer phases of continuous receive Active time than are optimal from a battery saving point of view.

FIG. 5 illustrates two events at times t1 and t2 during the handover phase which can be essential to have good communication between the S-eNB and the UE, and to retain the UE. The timer must be sufficiently long so that the Active time does not end ahead of time t2, which would otherwise result in the UE moving back to DRX sleep which ceases its ability to receive and, thus, cannot be reached by the S-eNB until next a time the UE is awake and ready to receive. FIG. 6 illustrates two events at times t1 and t2 during the handover phase. In the example of FIG. 6, the timer expires before a RRCConnectionReconfiguration message is received at time t2 from the S-eNB resulting in handover failure.

A current approach to attempt to avoid this problem is to use larger timer values (or alternatively to use short repetition cycles), which results in larger handover success rate and better Key Performance Indicator (KPI) retainability but is an unfavorable compromise for DRX with regards to the communication overhead required from the end points providing data services.

Table 1 lists some example compromise DRX schemes. Larger timer values and/or shorter cycles are used for situations where greater robustness for handover is needed.

TABLE 1

| Service | Load | Timer | Cycle |
| --- | --- | --- | --- |
| Mixed MBB | Low | psf100 | sf320 |
| Mixed MBB | High | psf200 | sf320 |
| VoLTE | Low | psf1 | sf40 |
| VoLTE | High | psf5 | sf20 |

In Table 1 the services correspond to service specific DRX biased by handover, the timer values are used to configure the drxInactivityTimer, and the cycle values are used to configure the cycle length associated with the longDRX-CycleStartOffset. The term VoLTE refers to voice over LTE, and the term MBB refers to mobile broadband.

There is a continuing problem to address the collision of interests between DRX and handover. The problem is particularly challenging with services that affect VoLTE performance. Service specific DRX increases packet delays and dropped packets, and increases the risk of dropped calls. Moreover, DRX may be tuned in a way that provides insufficient battery lifetime.

Mixed MBB is known to be very bursty with just occasional appearance of small amounts of traffic. Larger timer values, such as 100 ms or 200 ms, defeat many of the goals of DRX because the ever-lasting data tails repeatedly restart the timer before 100 ms or 200 ms has passed.

The negative consequences can be worse and more accentuated for paced services where smaller inactivity timers and larger cycles would otherwise provide much improved battery-savings without sacrificing service QoE. Table 2 lists three examples when service-specific DRX is not biased by handover needs and is better tuned to the services.

TABLE 2

| Service | Timer | Cycle |
| --- | --- | --- |
| Mixed MBB | psf5 | sf80 |
| Paced MBB | psf2 | sf640 |
| VoLTE | psf1 | sf40 |

In Table 2 the services correspond to service specific DRX biased. The time values are used to configure the drxInactivityTimer, and the cycle values are used to configure the cycle length associated with the longDRX-CycleStartOffset.

VoLTE provides managed voice which is a core value for the mobile network operator. Competition to VoLTE from Over the Top (OTT) competition, e.g. from Skype or FaceTime, increases the importance of VoLTE performance. Various approaches for increasing VoLTE performance can involve complex retransmission schemes which are unfavorable to both battery economy and handover performance.

It can be harder to find an acceptable compromise for Paced MBB. Paced MBB is important to operators in view of the overwhelming bulk of existing traffic which is handled as Paced MBB. An example of Paced MBB is streaming video such as Youtube or Netflix. Due to user abandonment, it is usually not a good approach to transfer too much content, e.g. a Youtube clip, at once but instead a better approach can be to pace the content. For this purpose efficient DRX schemes are needed which allow a client to quickly fill up a playout buffer and then pace such occasions. Streaming traffic over mobile networks, such as LTE, has been a substantial load on the mobile networks and data volumes are continuing to increase. The current trend suggests that more than half of all traffic over mobile internet will be streaming video.

Table 2 suggests that it may be better to select shorter timers instead of any compromise timers, and to use service-specific cycles instead of the timers that better serve handover. For example, with VoLTE the nature of the voice over IP service is well-defined and allows for matching of the regularity of DRX with that of voice packet arrivals. A shorter cycle can be used because although the UE moves back to DRX sleep quite shortly after t1 it will wake up with shorter regularity. Shorter cycles can be viewed as an opportunity to increase quality of communication, but could negatively affect performance. Shorter cycles, such as 40 ms, increase packet delays and dropped packets. The risk of dropped calls is always higher as a result of discontinued opportunities to communicate.

Operators now occasionally use approaches that manually toggle cell configuration and use the more robust values whenever higher load situations are expected to occur, such as from larger venues and user concentrations. These approaches can be cumbersome to implement. The approach may be difficult to tailor for an individual user's coverage since there is always a tail to the duration required for a procedure. The individual coverage or load situation may grow worse than what is expected in average and might require even more extended Active time for proper communication.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

Some embodiments of the present disclosure are directed to a method by a user equipment node (UE) for discontinuous reception (DRX) of traffic from a source radio access network (S-RAN) node of a telecommunications system. The method includes determining whether a condition has occurred that can trigger initiation of handover to a target RAN (T-RAN) node. Based on determining that the condition has not occurred, a selection is made among a plurality of service-specific DRX configurations based on a service type of the traffic from the S-RAN node, and DRX by the UE of traffic from the S-RAN node is controlled based on the selected service-specific DRX configuration. Based on determining that the condition has occurred, DRX by the UE of traffic from the S-RAN node is controlled based on a service-agnostic DRX configuration that is agnostic to the service type of the traffic from the S-RAN node.

A potential advantage of this approach is that it can provide coupling between DRX configuration schemes and a required level of connection robustness. When a condition occurs which can trigger initiation of handover to a target RAN, the UE ceases selecting among service-specific DRX configurations and begins using a service-agnostic DRX configuration that can improve UE messaging responsiveness and avoid the UE being dropped by the radio access network. The UE may begin to continuously receive messages from the S-eNB responsive to the service-agnostic DRX configuration, which can improve its operational reliability particularly during conditions of poor signal quality. When the condition no longer occurs, such as due to improved signal quality, the UE can resume selecting among service-specific DRX configurations to extend its battery life.

Some other embodiments of the present disclosure are directed to a UE providing DRX of traffic from a S-RAN node of a telecommunications system. The UE includes at least one processor, and at least one memory coupled to the at least one processor. The at least one processor includes computer readable program code embodied in the at least one memory that when executed by the at least one processor causes the at least one processor to perform operations. The operations include determining whether a condition has occurred that can trigger initiation of handover to a T-RAN node. Based on determining that the condition has not occurred, the operations include selecting among a plurality of service-specific DRX configurations based on a service type of the traffic from the S-RAN node, and controlling DRX by the UE of traffic from the S-RAN node based on the selected service-specific DRX configuration. Based on determining that the condition has occurred, the operations include controlling DRX by the UE of traffic from the S-RAN node based on a service-agnostic DRX configuration that is agnostic to the service type of the traffic from the S-RAN node.

Some other embodiments of the present disclosure are directed to a UE providing DRX of traffic from a S-RAN node of a telecommunications system. The UE includes a determining module, a selecting module, and a controlling module. The determining module is for determining whether a condition has occurred that can trigger initiation of handover to a T-RAN node. The selecting module is for, based on determining that the condition has not occurred, selecting among a plurality of service-specific DRX configurations based on a service type of the traffic from the S-RAN node, and controlling DRX by the UE of traffic from the S-RAN node based on the selected service-specific DRX configuration. The controlling module is for, based on determining that the condition has occurred, controlling DRX by the UE of traffic from the S-RAN node based on a service-agnostic DRX configuration that is agnostic to the service type of the traffic from the S-RAN node.

Some other embodiments of the present disclosure are directed to a method by a S-RAN node of a telecommunications system for controlling DRX by a UE of traffic from the S-RAN node. The method includes receiving a message from the UE. The method further includes, based on content of the message from the UE, sending a message to the UE containing a request for the UE to suspend control of DRX which uses selections among a plurality of service-specific DRX configurations based on a service type of traffic from the S-RAN node, and for the UE to initiate control of DRX that will use a service-agnostic DRX configuration that is agnostic to the service type of the traffic from the S-RAN node.

Some other embodiments of the present disclosure are directed to a S-RAN node of a telecommunications system for controlling DRX by a UE of traffic from the S-RAN node. The S-RAN node includes at least one processor and at least one memory coupled to the at least one processor and including computer readable program code embodied in the at least one memory that when executed by the at least one processor causes the at least one processor to perform operations. The operations include receiving a message from the UE, and, based on content of the message from the UE, sending a message to the UE containing a request for the UE to suspend control of DRX which uses selections among a plurality of service-specific DRX configurations based on a service type of traffic from the S-RAN node, and for the UE to initiate control of DRX that will use a service-agnostic DRX configuration that is agnostic to the service type of the traffic from the S-RAN node.

Some other embodiments of the present disclosure are directed to a S-RAN node of a telecommunications system for controlling DRX by a UE of traffic from the S-RAN node. The S-RAN node includes a receiving module and a sending module. The receiving module is for receiving a message from the UE. The sending module is for, based on content of the message from the UE, sending a message to the UE containing a request for the UE to suspend control of DRX which uses selections among a plurality of service-specific DRX configurations based on a service type of traffic from the S-RAN node, and for the UE to initiate control of DRX that will use a service-agnostic DRX configuration that is agnostic to the service type of the traffic from the S-RAN node.

Other methods, user equipment, and radio access networks according to embodiments of the invention will be apparent to one with skill in the art upon review of the following drawings and detailed description. It is intended that all such additional methods, user equipment, and radio access networks be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 3 illustrates operations and messaging between a UE and S-eNB of a radio access network for sending measurement reports in preparation for handover, and illustrates starting of a drx-InactivityTimer;

FIG. 4 illustrates a DRX-configuration data structure according to 3GPP TS 36.331 E-UTRA RRC;

FIGS. 13-22 are flowcharts of operations and methods performed by a UE for DRX of traffic from a source radio access network (S-RAN) node of a telecommunications system, according to some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Various present embodiments disclosed herein may overcome one or more of the potential problems explained above with some previously known approaches. Some embodiments are directed to providing a coupling between DRX configuration schemes and a required level of connection robustness. More specifically, unless a condition occurs which can trigger initiation of handover (e.g., a defined robustness event has not occurred and the connection quality is good), the UE operates in a mode configured to use a first DRX configuration. This mode configuration is service specific and optimized for battery savings with respect to the user services used; e.g. Mixed MBB, VoLTE or Paced MBB. In contrast, as soon as the condition occurs (e.g., when it would be better to keep a tighter connection between the UE and the network), the UE switches to operate in another mode that is configured to start using a second DRX configuration which provides more robust communications. While the other mode configuration provides less optimal battery savings it can be configured to provide a faster and more reliable communication path to the UE. The opposite switch from the other mode configuration back to the service specific configuration is done when the condition ceases to occur and the connection is again good. Operations and messsages associated with three example approaches are explained below.

A S-eNB is also referred to herein as a non-limiting example of a S-RAN node. Similarly, a T-eNB is also referred to herein as a non-limiting example of a T-RAN node.

FIGS. 13-16 are flowcharts of operations and methods performed by a UE for DRX of traffic from a S-RAN node of a telecommunications system. The operations and methods of FIGS. 13-16 can apply to all three of the example approaches explained below.

Figure 13:
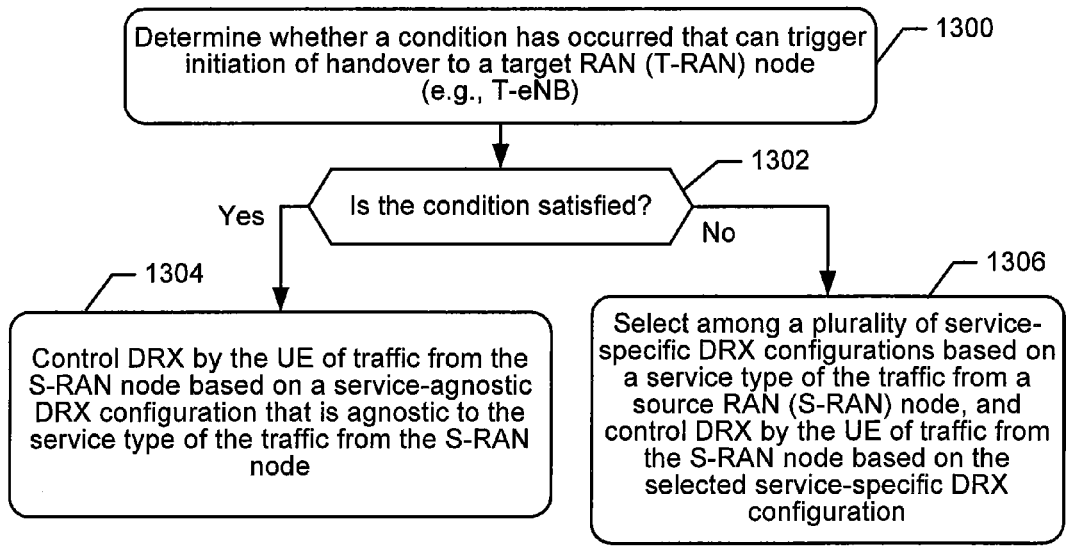

Referring to FIG. 13, the UE determines (block 1300) whether a condition has occurred that can trigger initiation of handover to a T-RAN node. The condition may correspond to mobility events which occurs when the UE starts or ceases to "move out of coverage from the serving cell". Based on determining (block 1302) that the condition has not occurred, the UE selects (block 1304) among a plurality of service-specific DRX configurations based on a service type of the traffic from the S-RAN node, and controls DRX by the UE of traffic from the S-RAN node based on the selected service-specific DRX configuration. In contrast, based on determining (block 1302) that the condition has occurred, the UE controls (block 1306) DRX of traffic from the S-RAN node based on a service-agnostic DRX configuration that is agnostic to the service type of the traffic from the S-RAN node. When the UE controls (block 1306) DRX based on a service-agnostic DRX configuration, it may suspend DRX to allow continuous receiving (e.g., of any PDCCH assignments from a network node, such as the S-eNB or, after handover, the T-eNB).

Figure 14:
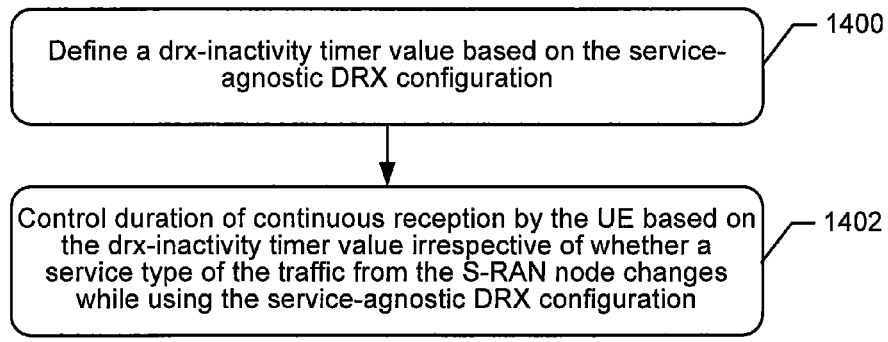

Referring to FIG. 14, when controlling (block 1306) DRX, the UE can define (block 1400), e.g., initiatize, a drx-inactivity timer value based on the service-agnostic DRX configuration, and control (block 1402) duration of continuous reception by the UE based on the drx-inactivity timer value irrespective of whether a service type of the traffic from the S-RAN node changes while using the service-agnostic DRX configuration.

Alternatively, when controlling (block 1306) DRX, the UE can suspend the selecting (block 1304) among the plurality of service-specific DRX configurations irrespective of any changes in a service type of the traffic from the S-RAN node.

Figure 15:
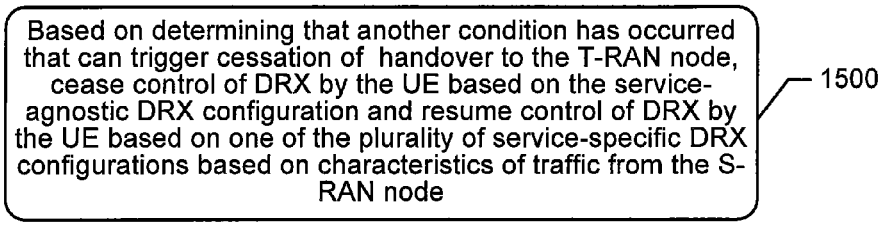

Referring to FIG. 15, based on determining that another condition has occurred that can trigger cessation of handover to the T-RAN node, the UE can cease (block 1500) controlling DRX based on the service-agnostic DRX configuration and resume controlling DRX based on one of the plurality of service-specific DRX configurations based on characteristics of traffic from the S-RAN node.

Similarly, Referring to FIG. 16, based on determining that another condition has occurred based on completing handover to the T-RAN node, the UE can cease (block 1600) controlling DRX based on the service-agnostic DRX configuration and resume selecting among a plurality of service-specific DRX configurations based on characteristics of traffic from the T-RAN node to use to control DRX by the UE.

Potential advantages of these embodiments may include increasing UE retainability (fewer dropped connections and fewer attempts to re-establish the connection) while also improving DRX for battery savings, which can improve user satisfaction with the UE. The connection provides a more robust communication when that is needed and fewer packets are dropped or delayed beyond their time budget. During times when instead there is no need for such robustness, DRX can use service-specific DRX configurations that are better tuned to providing maximum battery economy. These improvements can be particularly important to network operators who can have difficult to achieve targets for their KPI Key Performance Indicator that monitors dropped calls/connections.

Three example approaches are described below for controlling DRX of a UE. The first two approaches are directed to a radio access network explicitly controlling a UE via messaging to suspend the UE's selections among service-specific DRX configurations. The third approach is directed to the UE being implicitly controlled responsive to the UE determining that a defined condition (event) has occurred that triggers the UE to suspend its selections among service-specific DRX configurations.

Approach 1—

Figure 1:
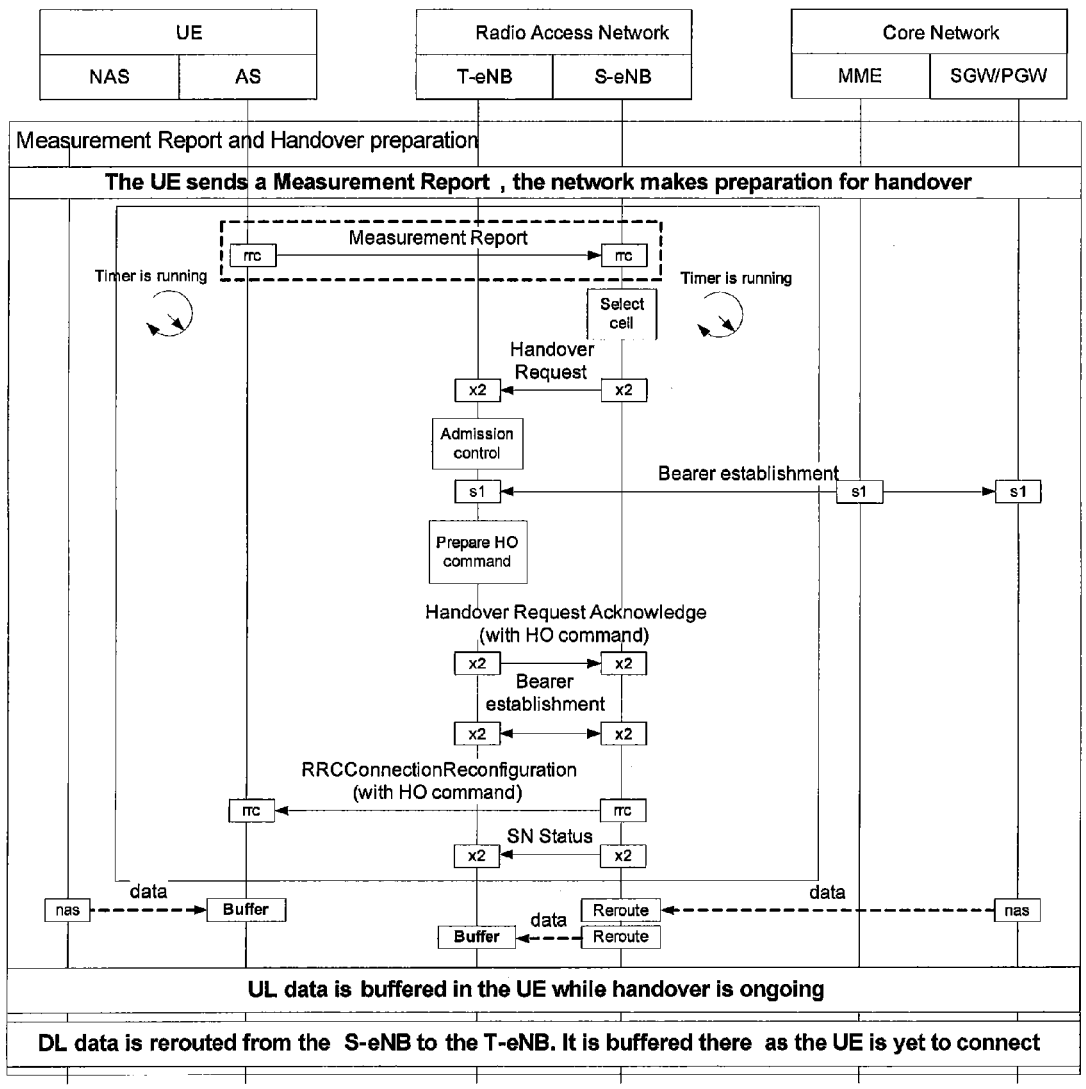
FIG. 1 illustrates operations and messaging between a UE, a T-eNB, S-eNB, and core network components of a telecommunications system to prepare for handover.
Figure 2:
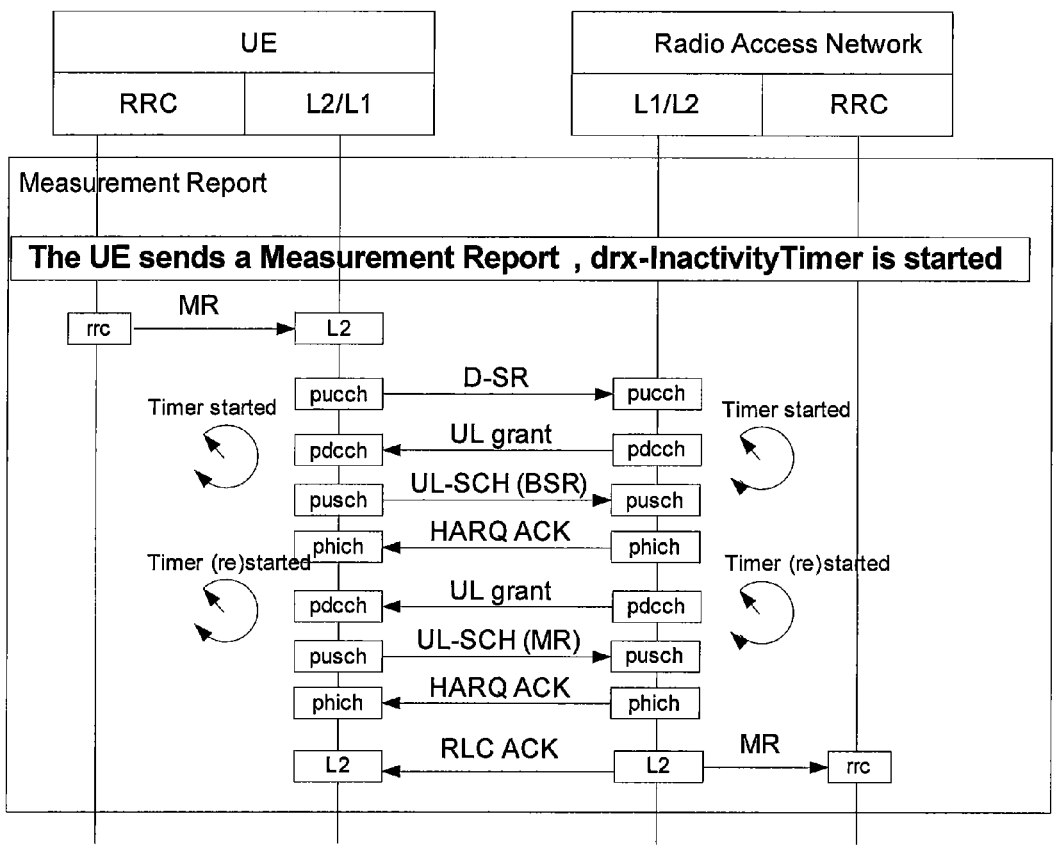
FIG. 2 illustrates operations and messaging between a UE and S-eNB of a radio access network for sending measurement reports in preparation for handover, and illustrates when a drx-InactivityTimer is started and restarted.
Figure 5:
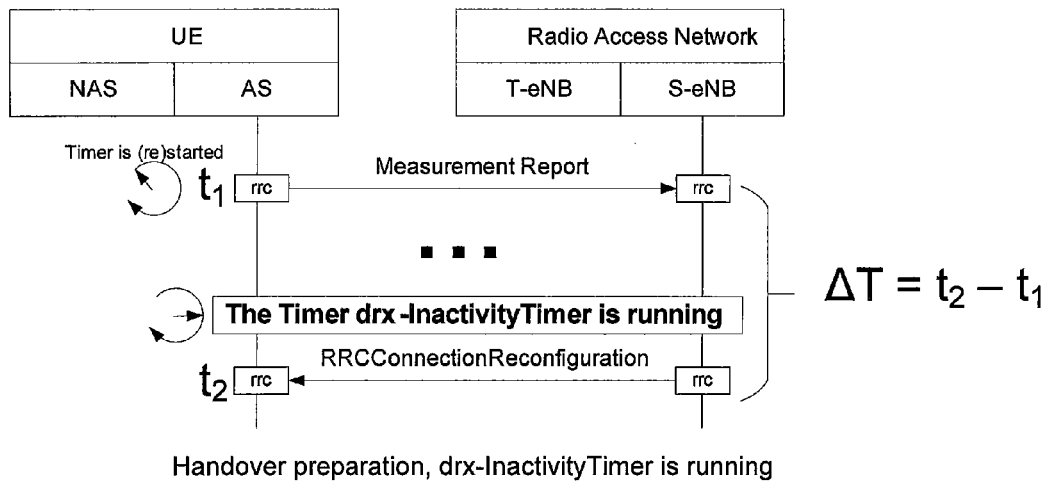
FIG. 5 illustrates operations and messaging between a UE and S-eNB of a radio access network for sending measurement reports in preparation for handover, and illustrates when a drx-InactivityTimer is started and restarted.
Figure 6:
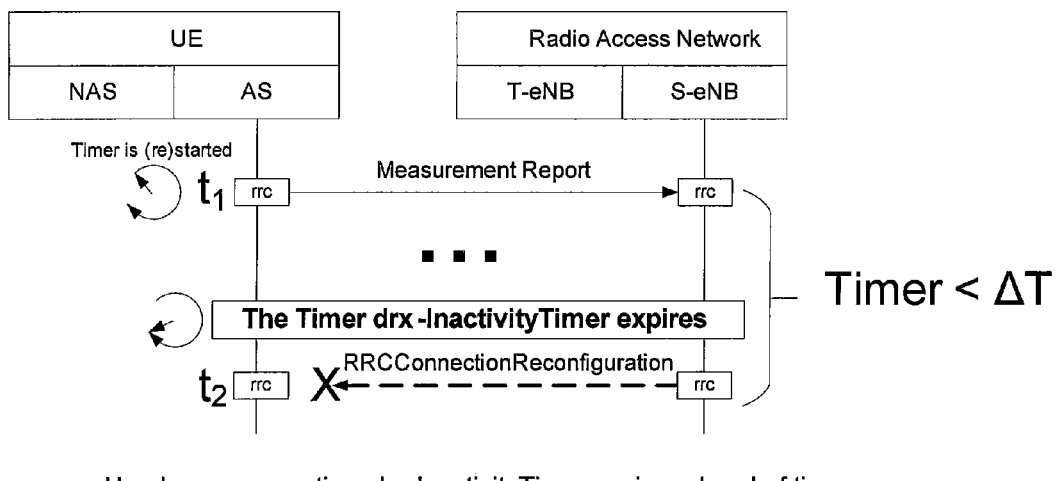
FIG. 6 illustrates operations and messaging between a UE and S-eNB of a radio access network for sending measurement reports in preparation for handover, and illustrates when a drx-InactivityTimer expires before being restarted.
Figure 7:
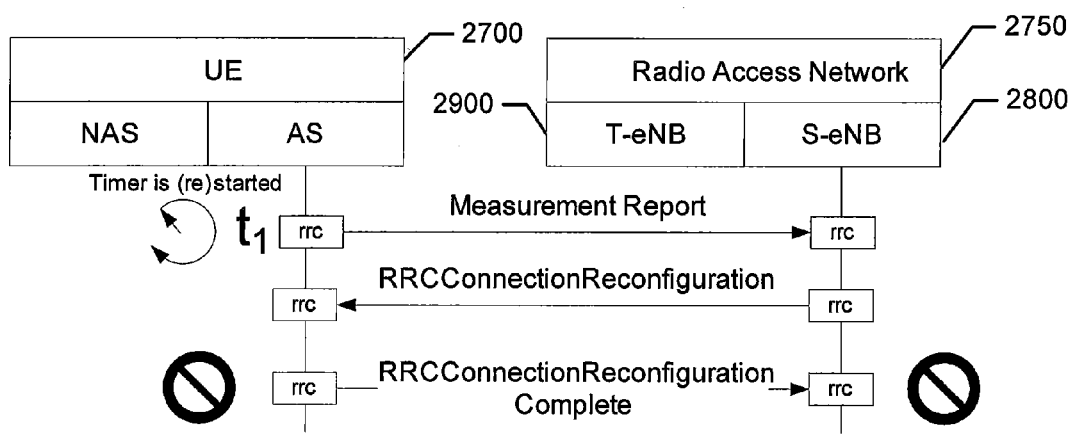
FIG. 7 illustrates operations and messaging between a UE and S-eNB of a radio access network for providing explicity control by the S-eNB over UE switching between using service-specific DRX configurations and a service-agnostic DRX configuration which is used to control DRX by the UE of traffic from the S-eNB according to embodiments of a first approach disclosed herein.

One approach for controlling a UE's use of DRX can include using standard procedures to enable a radio access network to start an immediate explicit reconfiguration of DRX with Information Element (IE) DRX-Config. FIG. 7 illustrates operations and messages by a UE 2700 and a S-eNB 2800 of a radio access network 2750 that explicitly trigger the UE 2700 to suspend use of a service-specific DRX configuration and initiate use of a robust service-agnostic DRX configuration. the UE 2700 responds to a reconfiguration (e.g., RRCConnectionReconfiguration message) from the S-eNB 2800 by suspending use of a service-specific DRX configuration and initiate use of a robust service-agnostic DRX configuration. The IE DRX-Config may be tuned to robust finite values or set to a value release (see Table 3). The UE 2700 is controlled to resume use of a service-specific DRX based on another reconfiguration (e.g., RRCConnectionReconfiguration message) controlled by a T-eNB 2900 after handover of the UE 2700.

TABLE 3

| Service | Timer | Cycle |
| --- | --- | --- |
| Service-agnostic 1 | >psf2560 | Any value |
| Service-agnostic 2 |  | drx release |

In Table 3 the services are agnostic to DRX, the time values are used to configure the drxInactivityTimer, and the cycle values are used to configure the cycle length associated with the longDRX-CycleStartOffset. It is noted that the max time value for use in some prior art systems is 2560 ms.

This approach may undesirably add substantial signaling to many communication paths, and add redundant signaling to paths that did not need or could not make necessary preparation for handover. Moreover, signaling is needed to restart service-specific DRX, e.g., 100 ms later, when the UE has synchronized to the T-eNB or when the communication path for some other reason no longer needs to be as robust. In the previous case, the required Drx-config can be merged with signaling that is needed for other reasons but in the latter case even more redundant signaling is added.

Approach 2—

Figure 8:
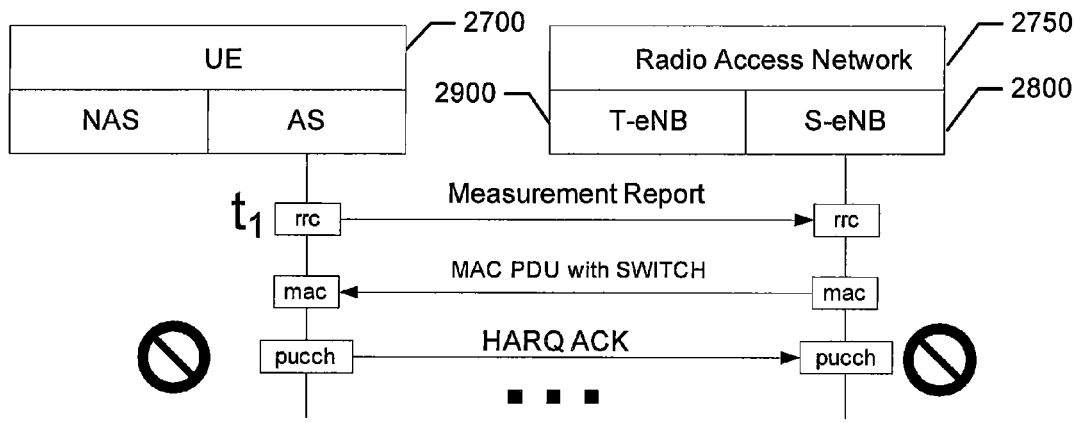
FIG. 8 illustrates operations and messaging between a UE and S-eNB of a radio access network for providing explicity control by the S-eNB over UE switching between using service-specific DRX configurations and a service-agnostic DRX configuration which is used to control DRX by the UE of traffic from the S-eNB according to embodiments of the second approach disclosed herein.
Figure 9:
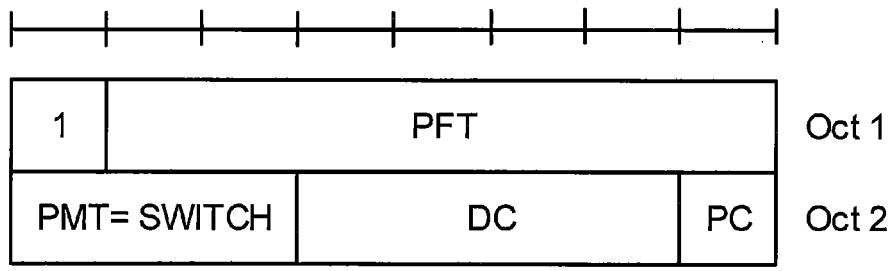
FIG. 9 illustrates content of an example switch message sent from the S-eNB to a UE according to embodiments of the second approach disclosed herein.
Figure 10:
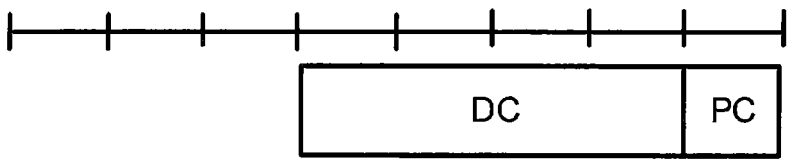
FIG. 10 illustrates content of another example switch message sent from the S-eNB to a UE according to embodiments of the second approach disclosed herein.

According to another approach, the radio access network maintains direct explicit control over the UE switching from selecting among service-specific DRX configurations and to instead using a robust service-agnostic DRX configuration. This approach may provide more immediate control of the switching and use less extensive messages for control than the first approach. FIGS. 8-10 illustrate an embodiment of this approach which uses an extension to the Medium Access Control (MAC) protocol to provide improvements over the RRC approach of FIG. 7. The radio access network 2750 communicates with the UE using the MAC protocol to control scheduler interaction with DRX.

FIG. 8 illustrates operations and messages that explicitly trigger the UE 2700 to suspend its use of the service-specific DRX configuration operation and instead use the robust service-agnostic DRX configuration. FIG. 9 illustrates an example SWITCH message that can be sent from the S-eNB 2800 of the radio access network 2750 to the UE 2700 to cause the UE 2700 to suspend its use of the service-specific DRX configuration operation. The example SWITCH message has a fixed size of 2 bytes and has the following fields:

N: The Next field can be one bit. The N field in the example switch message is set to 1 to indicate that the format of the second byte is PMT and PMB;

PFT: The Protocol Feature Type field can be 7 bits. The PFT can be set to the value used in the first byte of INITIAL MESSAGE;

PMT: The Protocol Message Type field size can be 3 bits. The PMT in the SWITCH message can be set to 001; and PMB: The Protocol Message Body for the switch message on DL-SCH can be as shown in FIG. 10.

The example format of the SWITCH message of FIGS. 9 and 10 is provided for completeness and without limitation to other formats of SWITCH messages that can be used herewith. Any SWITCH message format can be used that contains one or more bits configured to explicitly trigger the UE 2700 to suspend its use of the service-specific DRX configuration operation and instead use the robust service-agnostic DRX configuration.

Referring to FIG. 10, the size of the PMB for the switch message can be 5 bits and have the following fields:

DC: The DC field can be 4 bits which indicates a DRX configuration; and

PC: The PC field can be a flag with an implication that depends on DC (e.g., not used here).

Figure 11:
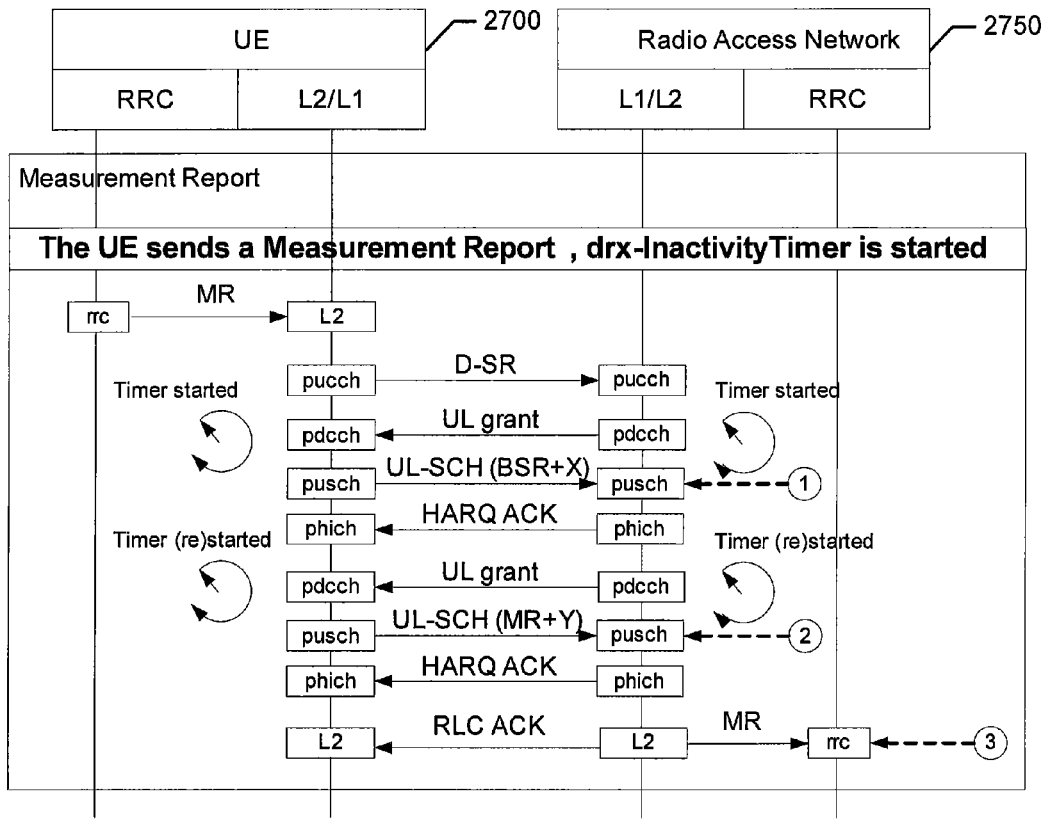
FIG. 11 illustrates operations and message flows that can be performed by the S-eNB and the UE for a SWITCH message to be communicated through MAC, such as by inband MAC according to embodiments of the second approach disclosed herein.

FIG. 11 illustrates operations and message flows that can be performed by the radio access network 2750 and the UE 2700 for a SWITCH message to be communicated through MAC, such as by inband MAC. A trigger condition for sending the SWITCH message can be the reception of a BSR asking for a grant related to DCCH or the reception of a MAC PDU with a DCCH content (see (1) and (2) in FIG. 11), or assisted by a quick termination by higher layer (see (3) in FIG. 11). Sending of the SWITCH message could also be triggered by a request X or Y (FIG. 11) from the UE which is sent in the same PDU as that which contains the BSR (X in FIG. 11) or the Measurement Report (Y in FIG. 11).

FIGS. 17-20 are flowcharts of more general operations and methods performed by a UE for DRX of traffic from a S-RAN node of a telecommunications system, according to one or both of the first and second approaches.

In the further embodiment of FIG. 17, the UE determines (block 1700) that the condition has occurred which can trigger initiation of handover to a T-RAN node based on receiving a control message from the S-RAN node, where the control message contains DRX configuration data. The UE uses the DRX configuration data to define (block 1702) the service-agnostic DRX configuration which is used to control DRX of traffic from the S-RAN node.

The DRX configuration data may contain a flag, index, or pointer to a service-agnostic DRX configuration already stored in memory of the UE, or the DRX configuration data may contain information that defines the service-agnostic DRX configuration for storage in the UE. The UE may control duration of continuous reception by the UE based on a drx-inactivity timer value that is defined based on the DRX configuration data.

In the further embodiment of FIG. 18, the UE determines (block 1800) whether an entering condition has occurred for triggering reporting of measurements to the S-RAN node. Based on determining that the entering condition has occurred, the UE initiates (block 1802) reporting of measurements to the S-RAN node, where at least one of the reports contains a request for the S-RAN node to suspend the UE's use of the service-specific DRX configurations. The UE can then determine that the condition has occurred which can trigger initiation of handover to a T-RAN node based on receiving (block 1804) a message from the S-RAN node controlling the UE to suspend the selecting among the plurality of service-specific DRX configurations irrespective of any changes in a service type of the traffic from the S-RAN node.

Figure 19:
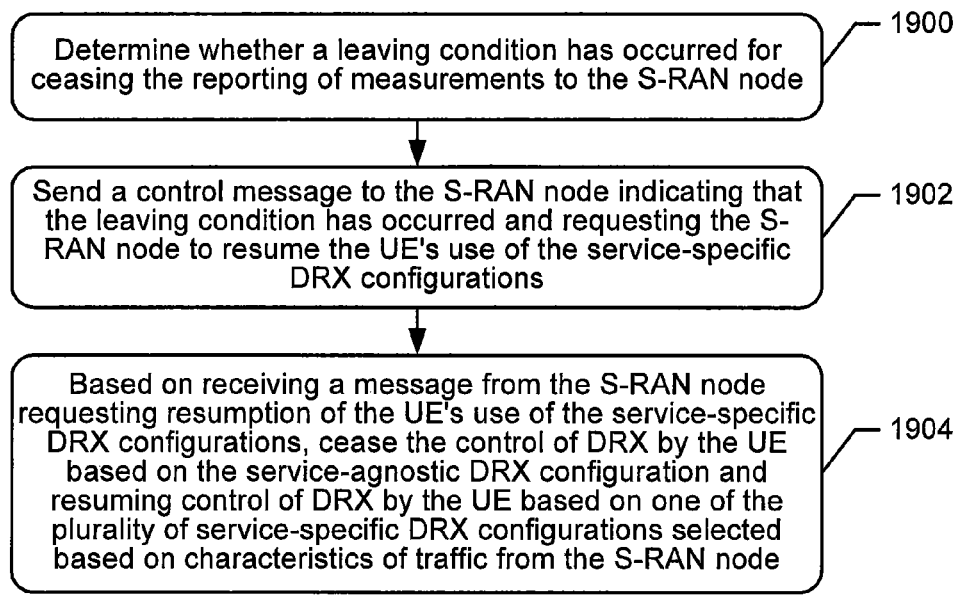

In the further embodiment of FIG. 19, the UE determines (block 1900) whether a leaving condition has occurred for ceasing the reporting of measurements to the S-RAN node. Based on determining that the leaving condition has occurred, the UE sends (block 1902) a control message to the S-RAN node indicating that the leaving condition has occurred and requests the S-RAN node to resume the UE's use of the service-specific DRX configurations. Based on receiving a message from the S-RAN node requesting resumption of the UE's use of the service-specific DRX configurations, the UE ceases (block 1904) the controlling DRX based on the service-agnostic DRX configuration and resumes controlling DRX based on one of the plurality of service-specific DRX configurations selected based on characteristics of traffic from the S-RAN node.

Figure 20:
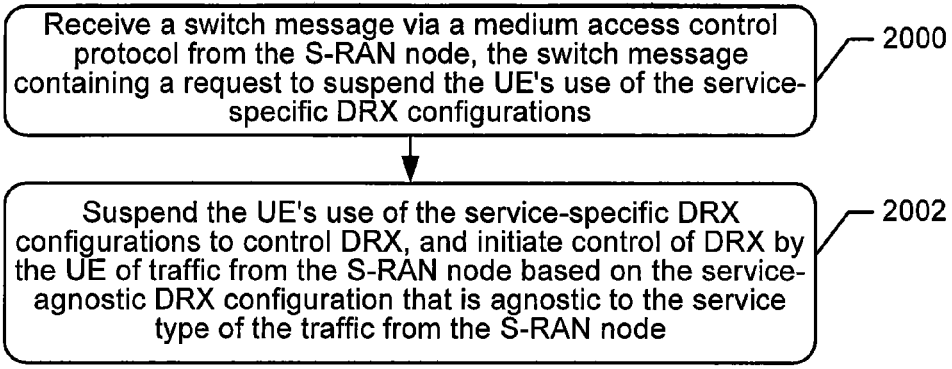

In the further embodiment of FIG. 20, the UE receives (block 2000) a switch message via a medium access control (MAC) protocol from the S-RAN node. The switch message contains a request to suspend the UE's use of the service-specific DRX configurations. Based on the request, the UE suspends (block 2002) use of the service-specific DRX configurations for controlling DRX and initiates controlling DRX of traffic from the S-RAN node based on the service-agnostic DRX configuration that is agnostic to the service type of the traffic from the S-RAN node.

FIGS. 23-26 are flowcharts of related operations and methods performed by a S-RAN node of a telecommunications system for controlling DRX by a UE of traffic from the S-RAN node, according to one or both of the first and second approaches.

Figure 23:
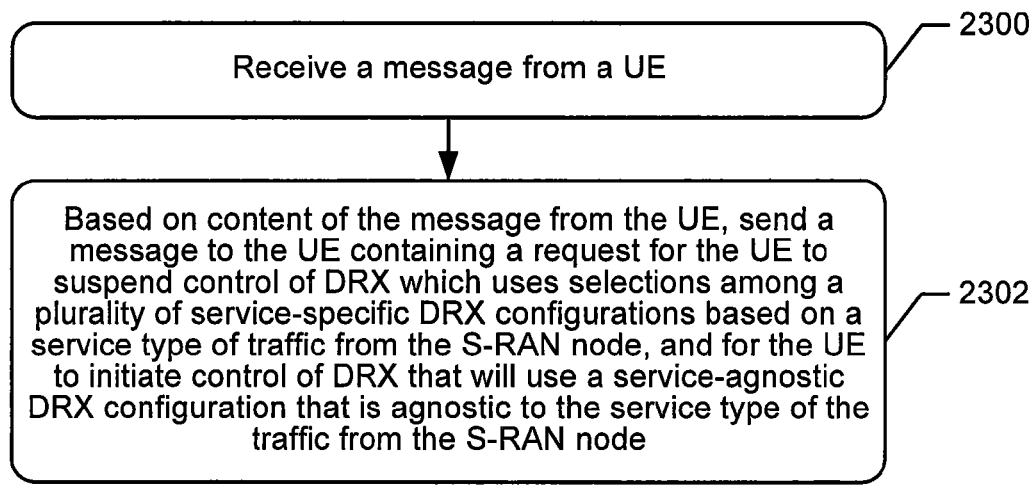
FIGS. 23-26 are flowcharts of operations and methods performed by a S-RAN node of a telecommunications system for controlling DRX by a UE of traffic from the S-RAN node, according to some embodiments.

In the further embodiment of FIG. 23, the S-RAN node receives (block 2300) a message from the UE. Based on content of the message from the UE, the S-RAN sends (block 2302) a message to the UE containing a request for the UE to suspend control of DRX which uses selections among a plurality of service-specific DRX configurations based on a service type of traffic from the S-RAN node, and for the UE to initiate control of DRX that will use a service-agnostic DRX configuration that is agnostic to the service type of the traffic from the S-RAN node.

Figure 24:
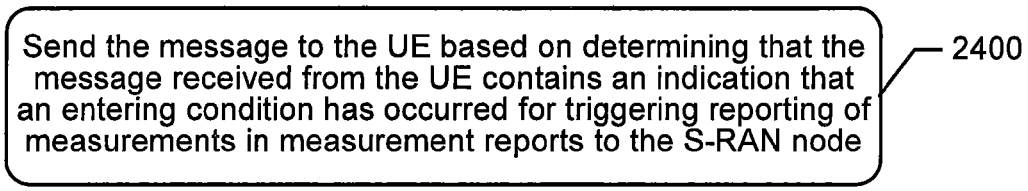

In the further embodiment of FIG. 24, when sending (block 2302) the message to the UE containing the request, the S-RAN node may send (block 2400) the message to the UE based on determining that the message received from the UE contains an indication that an entering condition has occurred for triggering reporting of measurements in measurement reports to the S-RAN node.

Figure 25:
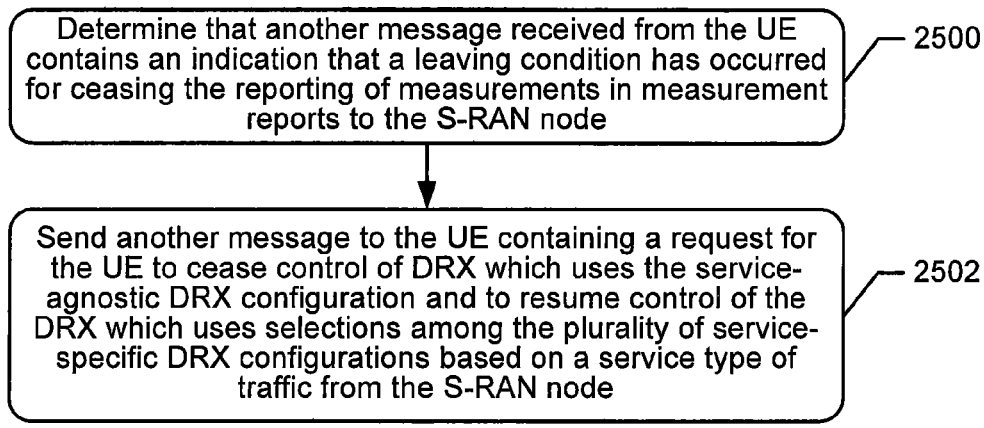

With reference to FIGS. 23-25, the S-RAN node determines (block 2500) that another message received from the UE contains an indication that a leaving condition has occurred for ceasing the reporting of measurements in measurement reports to the S-RAN node. Based on determining (block 2500) that the leaving condition has occurred, the S-RAN node sends (block 2502) another message to the UE containing a request for the UE to cease control of DRX which uses the service-agnostic DRX configuration and to resume control of the DRX which uses selections among the plurality of service-specific DRX configurations based on a service type of traffic from the S-RAN node.

The message received (block 2300) from the UE can include a measurement report. The step of sending (block 2400) the message to the UE containing the request can include sending the message to the UE based on determining that the measurement report contains a measurement of signals received by the UE that satisfies a condition for initiating handover of the UE to a T-RAN node.

The message sent (block 2400) to the UE containing the request, can include DRX configuration data that the UE uses to determine the service-agnostic DRX configuration.

Figure 26:
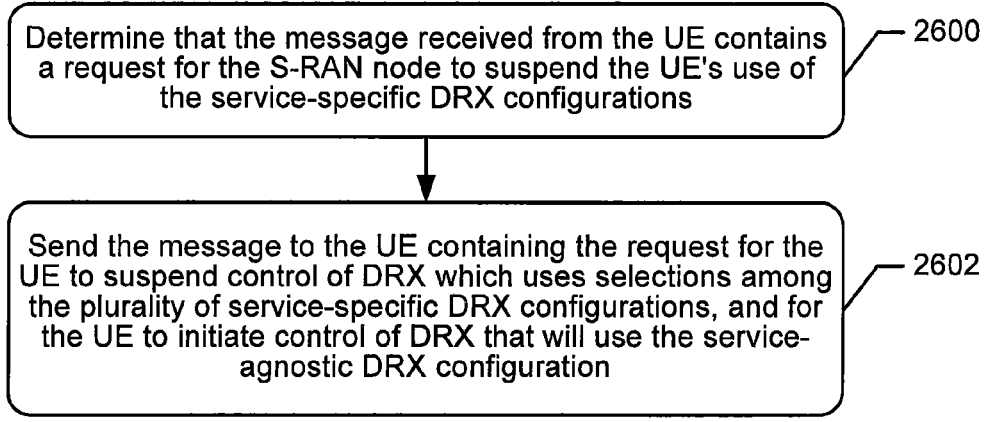

In the further embodiment of FIG. 26, the step of sending (block 2302) the message to the UE (2700) containing the request, can include the S-RAN node determining (block 2600) that the message received from the UE contains a request for the S-RAN node to suspend the UE's use of the service-specific DRX configurations. Based on the request, the S-RAN node sends (block 2602) the message to the UE containing the request for the UE to suspend control of DRX which uses selections among the plurality of service-specific DRX configurations, and for the UE to initiate control of DRX that will use the service-agnostic DRX configuration.

Approach 3—

According to another approach, the UE is configured to determine when a defined condition occurs that can trigger initiation of handover to a T-eNB (or other T-RAN node) without requiring explicit signalling from a radio access network. The defined condition can correspond to one or more defined robustness events which the UE monitors to determine when it will implicitly switch from using the service-specific DRX configuration to using the robust service-agnostic DRX configuration. The robustness events may be one or more of the same mobility events which occur when the UE starts or ceases to "move out of coverage from the serving cell". In one embodiment, the robust DRX configuration may preferably be one where DRX is released (suspended until further notice).

Figure 12:
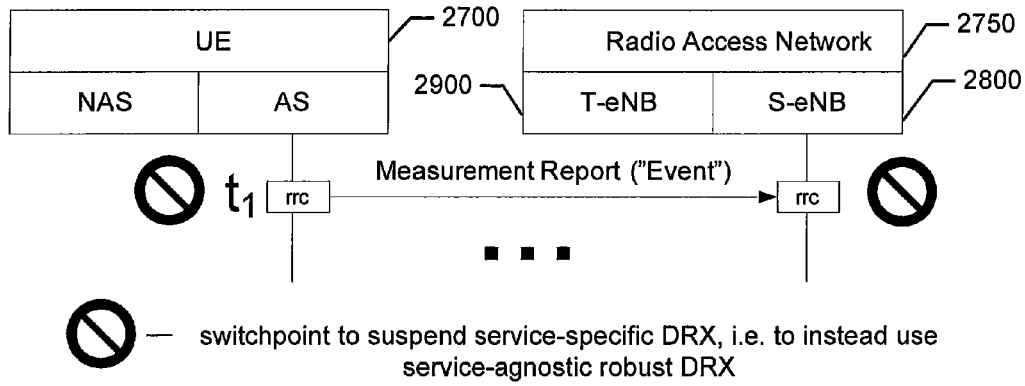
FIG. 12 illustrates operations and messaging that implicitly trigger a UE to switch from the service-specific DRX configuration to the robust service-agnostic DRX configuration for receiving from a S-eNB according to embodiments of a third approach disclosed herein.
Figure 21:
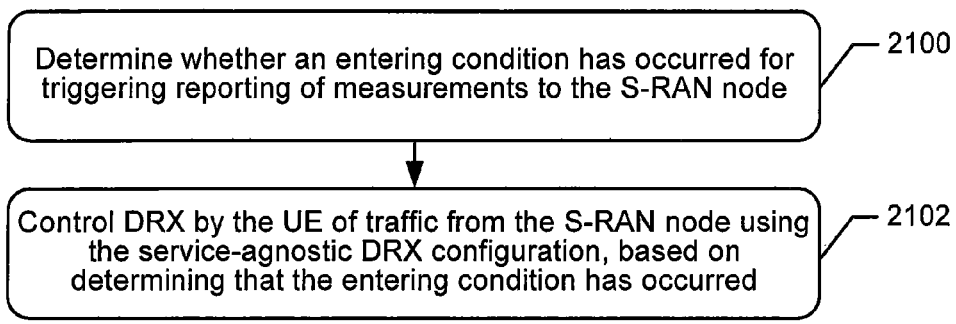
Figure 22:
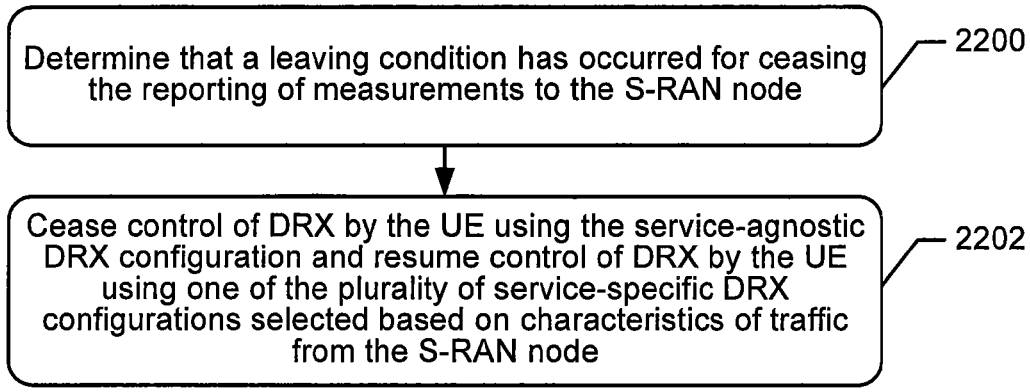

FIG. 12 illustrates operations and messages that implicity trigger a UE 2700 to switch from the service-specific DRX configuration to the robust service-agnostic DRX configuration for receiving from a S-eNB 2800 (or other S-RAN node). FIGS. 21 and 22 are flowcharts of operations and methods that may be performed by a UE for DRX of traffic from a S-RAN node (e.g., S-eNB 2800) according to some embodiments of this approach. Referring to FIG. 21, when determining whether the condition has occurred that can trigger initiation of handover to the T-RAN node (e.g., T-eNB 2900), the UE can determine (block 2100) whether an entering condition has occurred for triggering reporting of measurements to the S-RAN node. The entering condition is also called an entering condition. The UE can can then control (block 2102) DRX of traffic from the S-RAN node using the service-agnostic DRX configuration, based on determining that the entering condition has occurred.

Referring to FIG. 22, the UE may furthermore determine (block 2200) whether a leaving condition has occurred for ceasing the reporting of measurements to the S-RAN node. Based on determining that the leaving condition has occurred, the UE can cease (block 2202) controlling DRX using the service-agnostic DRX configuration and resume control of DRX using one of the plurality of service-specific DRX configurations selected based on characteristics of traffic from the S-RAN node.

Some of the operations may be performed using some existing protocol specifications, which may thereby add one more action to the list of UE actions performed responsive to detecting events that may trigger handover or, in the context of various of the present approaches, may require a robust communication path. The UE may determine (block 2100 of FIG. 21) whether an entering condition has occurred for triggering reporting of measurements to the S-RAN node based on 3GPP TS 36.331 including, but are not limited to, any one or more of Event A2, Event A3, Event A5, Event A6, Event B1, and Event B2.

For Event A2, the UE determines (block 2100) if the S-eNB has become worse than a defined threshold. The UE performs measurements on signals received from the S-RAN node (service cell), which may be Reference Signal Received Quality (RSRQ) and/or Reference Signal Received Power (RSRP), and which may be performed without taking into account any offsets. RSRP can be measured as an average of power levels received across all Reference Signal symbols within the considered measurement frequency bandwidth. The UE compares the measurements to a defined threshold value, which may be defined within a reportConfigugEUTRA message, to determine when Event A2 (entering condition for reporting) has occurred. The UE may combine each measurement value (Ms) with a hysteresis parameter (Hys) for this event, and compare the result to a threshold value (Thresh) to determine whether the comparison satisfies Event A2 (entering condition for reporting). The threshold value and the hysteresis value may be defined by a reportConfigugEUTRA message received by the UE from the network for Event A2.

For example, the UE can determine that an entering condition for the Event A2 is satisfied (has occurred) when the following condition is satisfied:

$Ms+Hys<Thresh.$     Inequality A2-1 (Entering condition)

The UE can determine that a leaving condition for the Event A2 is satisfied (has occurred) when the following condition is satisfied $Ms-Hys>Thresh.$     Inequality A2-2 (Leaving condition)

For Event A3, the UE determines if a neighbor eNB, e.g., T-eNB, has become an offset amount better than the Primary Cell (PCell), e.g., S-eNB, or Primary Secondary Cell (PS-CeII). The UE can determine that an entering condition for the Event A3 is satisfied (has occurred) when the following condition is satisfied:

$Mn+Ofn+Ocn-Hys>Mp+Ofp+Ocp+Off.$     Inequality A3-1 (Entering condition)

The UE can determine that a leaving condition for the Event A3 is satisfied (has occurred) when the following condition is satisfied $Mn+Ofn+Ocn+Hys<Mp+Ofp+Ocp+Off.$     Inequality A3-2 (Leaving condition)

In the conditional equations for Event A3, the terms have the following meanings:
1) Mn is the measurement result of the neighboring cell, not taking into account any offsets;
2) Ofn is the frequency specific offset of the frequency of the neighboring cell (i.e. offsetFreq as defined within measObjectEUTRA corresponding to the frequency of the neighbour cell);
3) Ocn is the cell specific offset of the neighbour cell (i.e. cellIndividualOffset as defined within measObjectEUTRA corresponding to the frequency of the neighbour cell), and set to zero if not configured for the neighbour cell;
4) Mp is the measurement result of the PCell/PSCeII, not taking into account any offsets;
5) Ofp is the frequency specific offset of the frequency of the PCell/PSCell (i.e. offsetFreq as defined within measObjectEUTRA corresponding to the frequency of the PCell/PSCeII);
6) Ocp is the cell specific offset of the PCell/PSCeII (i.e. cellIndividualOffset as defined within measObject-EUTRA corresponding to the frequency of the PCell/PSCeII), and is set to zero if not configured for the PCell/PSCeII;
7) Hys is the hysteresis parameter for this event (i.e. hysteresis as defined within reportConfigEUTRA for this event); and
8) Off is the offset parameter for this event (i.e. a3-Offset as defined within reportConfigEUTRA for this event).

The UE can respond to a comparison satisfying the entering condition by suspending use of the service-specific DRX configurations for controlling DRX of traffic from the S-RAN node and initiate use of the service-agnostic DRX configuration to control DRX. In contrast, the UE can respond to a comparison satisfying the leaving condition by ceasing use of the service-agnostic DRX configuration to control DRX of traffic from the S-RAN node and resume using selections among the service-specific DRX configurations to control DRX.

For Event A5, the UE determines if a PCell, e.g., S-eNB, or PSCeII has become worse than a first threshold value (threshold1) and a neighbor eNB has become better than a second threshold value (threshold2). For example, the UE can perform measurements on signals received from the S-RAN node and perform measurements on signals received from the T-RAN node. The UE can determine whether comparison of the measurements on signals satisfies the entering condition for the Event A5 is satisfied (has occurred) when the following two conditions are satisfied:

$Mp+Hys<Thresh1$     Inequality A5-1 (Entering condition 1)

$Mn+Ofn+Ocn-Hys>Thresh2$     Inequality A5-2 (Entering condition 2)

Thus, for example, the UE can determine whether comparison of the measurements on signals received from the S-RAN node to a first threshold (Thresh1) and comparison of the measurements on signals received from the T-RAN node to a second threshold (Thresh2) satisfy the entering condition. The UE can then respond to the comparisons satisfying the entering condition by controlling DRX of traffic from the S-RAN node using the service-agnostic DRX configuration.

The UE can determine that a leaving condition for the Event A5 is satisfied (has occurred) when the following two conditions are satisfied:

$Mp-Hys>Thresh1$     Inequality A5-3 (Leaving condition 1)

$Mn+Ofn+Ocn+Hys<Thresh2.$     Inequality A5-4 (Leaving condition 2)

In the conditional equations for Event A5, the terms have the following meanings:
1) Mp is the measurement result of the PCeII or PSCeII, not taking into account any offsets;
2) Mn is the measurement result of the neighboring cell, not taking into account any offsets;
3) Ofn is the frequency specific offset of the frequency of the neighbor cell (i.e. offsetFreq as defined within measObjectEUTRA corresponding to the frequency of the neighbor cell);
4) Ocn is the cell specific offset of the neighbor cell (i.e. cellIndividualOffset as defined within measObject-EUTRA corresponding to the frequency of the neighbor cell), and set to zero if not configured for the neighbor cell;
5) Hys is the hysteresis parameter for this event (i.e. hysteresis as defined within reportConfigEUTRA for this event);

6) Thresh1 is the threshold parameter for this event (i.e. a5-Threshold1 as defined within reportConfigEUTRA for this event); and
7) Thresh2 is the threshold parameter for this event (i.e. a5-Threshold2 as defined within reportConfigEUTRA for this event).

The UE can respond to the comparisons satisfying the entering conditions (entering conditions 1 and 2) by suspending use of the service-specific DRX configurations for controlling DRX of traffic from the S-RAN node and initiate use of the service-agnostic DRX configuration to control DRX. In constrast, the UE can respond to the comparisons satisfying the leaving conditions (leaving conditions 1 and 2) by ceasing use of the service-agnostic DRX configuration for controlling DRX of traffic from the S-RAN node and resume using selections among the service-specific DRX configurations to control DRX.

For Event A6, the UE determines if a neighbor, e.g., T-eNB, has become a defined offset amount better than the SCell. The UE can determine that an entering condition for the Event A6 is satisfied (has occurred) when the following condition is satisfied:

$$Mn+Ocn-Hys>Ms+Ocs+Off. \quad \text{Inequality A6-1 (Entering condition)}$$

The UE can determine that a leaving condition for the Event A6 is satisfied (has occurred) when the following condition is satisfied:

$$Mn+Ocn+Hys<Ms+Ocs+Off. \quad \text{Inequality A6-2 (Leaving condition)}$$

In the conditional equations for Event A6, the terms have the following meanings:
1) Mn is the measurement result of the neighboring cell, not taking into account any offsets;
2) Ocn is the cell specific offset of the neighbor cell (i.e. cellIndividualOffset as defined within measObjectEUTRA corresponding to the frequency of the neighbor cell), and set to zero if not configured for the neighbor cell;
3) Ms is the measurement result of the serving cell, not taking into account any offsets;
4) Ocs is the cell specific offset of the serving cell (i.e. cellIndividualOffset as defined within measObjectEUTRA corresponding to the serving frequency), and is set to zero if not configured for the serving cell;
5) Hys is the hysteresis parameter for this event (i.e. hysteresis as defined within reportConfigEUTRA for this event); and
6) Off is the offset parameter for this event (i.e. a6-Offset as defined within reportConfigEUTRA for this event).

The UE can respond to the comparison satisfying the entering condition by suspending use of the service-specific DRX configurations for controlling DRX of traffic from the S-RAN node and initiate use of the service-agnostic DRX configuration to control DRX. In constrast, the UE can respond to the comparison satisfying the leaving condition by ceasing use of the service-agnostic DRX configuration for controlling DRX of traffic from the S-RAN node and resume using selections among the service-specific DRX configurations to control DRX.

For Event B1, the UE determines if an inter Radio Access Technology (RAT) neighbor has become better than a defined offset. The UE can determine that an entering condition for the Event B1 is satisfied (has occurred) when the following condition is satisfied:

$$Mn+Ofn-Hys>Thresh. \quad \text{Inequality B1-1 (Entering condition)}$$

The UE can determine that a leaving condition for the Event B1 is satisfied (has occurred) when the following condition is satisfied:

$$Mn+Ofn+Hys<Thresh. \quad \text{Inequality B1-2 (Leaving condition)}$$

In the conditional equations for Event B1, the terms have the following meanings:
1) Mn is the measurement result of the inter-RAT neighbour cell, not taking into account any offsets. For CDMA 2000 measurement result, pilotStrength is divided by −2;
2) Ofn is the frequency specific offset of the frequency of the inter-RAT neighbour cell (i.e. offsetFreq as defined within the measObject corresponding to the frequency of the neighbour inter-RAT cell);
3) Hys is the hysteresis parameter for this event (i.e. hysteresis as defined within reportConfigInterRAT for this event); and
4) Thresh is the threshold parameter for this event (i.e. b1-Threshold as defined within reportConfigInterRAT for this event). For CDMA2000, b1-Threshold is divided by −2.

The UE can respond to the comparison satisfying the entering condition by suspending use of the service-specific DRX configurations for controlling DRX of traffic from the S-RAN node and initiate use of the service-agnostic DRX configuration to control DRX. In constrast, the UE can respond to the comparison satisfying the leaving condition by ceasing use of the service-agnostic DRX configuration for controlling DRX of traffic from the S-RAN node and resume using selections among the service-specific DRX configurations to control DRX.

For Event B2, the UE determines if a PCell has become worse than a first threshold (threshold1) and an inter RAT neighbor has become better than a second threshold (threshold2). The UE can determine that an entering condition for the Event B2 is satisfied (has occurred) when the following two conditions are satisfied:

$$Mp+Hys<Thresh1 \quad \text{Inequality B2-1 (Entering condition 1)}$$

$$Mn+Ofn-Hys>Thresh2. \quad \text{Inequality B2-2 (Entering condition 2)}$$

The UE can determine that a leaving condition for the Event B2 is satisfied (has occurred) when the following two conditions are satisfied:

$$Mp-Hys>Thresh1 \quad \text{Inequality B2-3 (Leaving condition 1)}$$

$$Mn+Ofn+Hys<Thresh2. \quad \text{Inequality B2-4 (Leaving condition 2)}$$

In the conditional equations for Event B2, the terms have the following meanings:
1) Mp is the measurement result of the PCell, not taking into account any offsets;
2) Mn is the measurement result of the inter-RAT neighbor cell, not taking into account any offsets. For CDMA2000 measurement result, pilotStrength is divided by −2;
3) Ofn is the frequency specific offset of the frequency of the inter-RAT neighbor cell (i.e. offsetFreq as defined within the measObject corresponding to the frequency of the inter-RAT neighbor cell);
4) Hys is the hysteresis parameter for this event (i.e. hysteresis as defined within reportConfigInterRAT for this event);
5) Thresh1 is the threshold parameter for this event (i.e. b2-Threshold1 as defined within reportConfigInterRAT for this event); and 6) Thresh2 is the threshold parameter for this event (i.e. b2-Threshold2 as defined within reportConfigInterRAT for this event). For CDMA2000, b2-Threshold2 is divided by −2.

The UE can respond to the comparison satisfying the entering condition by suspending use of the service-specific DRX configurations for controlling DRX of traffic from the S-RAN node and initiate use of the service-agnostic DRX configuration to control DRX. In contrast, the UE can respond to the comparison satisfying the leaving condition by ceasing use of the service-agnostic DRX configuration for controlling DRX of traffic from the S-RAN node and resume using selections among the service-specific DRX configurations to control DRX.

Further General Operations—

In accordance with one or more of the embodiments disclosed herein, a UE can monitor and report entering and leaving conditions for events that may trigger handover. When detecting and reporting the entering condition for such an event, the UE may operate to: 1) suspend DRX when sending that report to the mobile communication network; or 2) piggy-backing a control message to that report which requests its peer in the mobile communication network to suspend DRX, and then wait for the network to send a message to concur and activate such a suspension.

When detecting and reporting the leaving condition for such an event, the UE may operate to: 1) resume DRX when sending that report to the radio access network; 2) piggyback a control message to that report which requests its peer in the radio access network to resume DRX, and then wait for the radio access network to send a message to concur and activate such resumption; or 3) wait for the network to send a message to deactivate the suspension.

After having either suspended handover and completed handover, the UE may operate to wait for the radio access network to to send a message to deactivate the suspension of DRX.

The radio access network may operate to control the entering and leaving conditions for events monitored by the UE which may trigger handover, and monitor reporting of these events from the UE. The radio access network responds to receipt of a report of the entering condition for one of the events by: 1) suspending DRX; or 2) receiving a control message with that report where the UE requests to suspend DRX, and responding thereto by sending a message to the UE requesting the UE to activate the suspension.

The radio access network may respond to receiving a report on the leaving condition for such an event, by: 1) resuming DRX; responding to receipt of a control message with that report where the UE requests to resume DRX, by sending a message to the UE requesting resumption of DRX; or 3) sending a message to the UE to deactivate the suspension of DRX.

The radio access network may respond to having suspended handover and completed handover, by sending a message to the UE to deactivate the suspension of DRX.

Example UE and RAN

Non-limiting example user equipment nodes (UEs) can include, but are not limited to, tablet computers, mobile terminals, smart phones, desktop computers, laptop embedded equipped (LEE), laptop mounted equipment (LME), etc.

Figure 27:
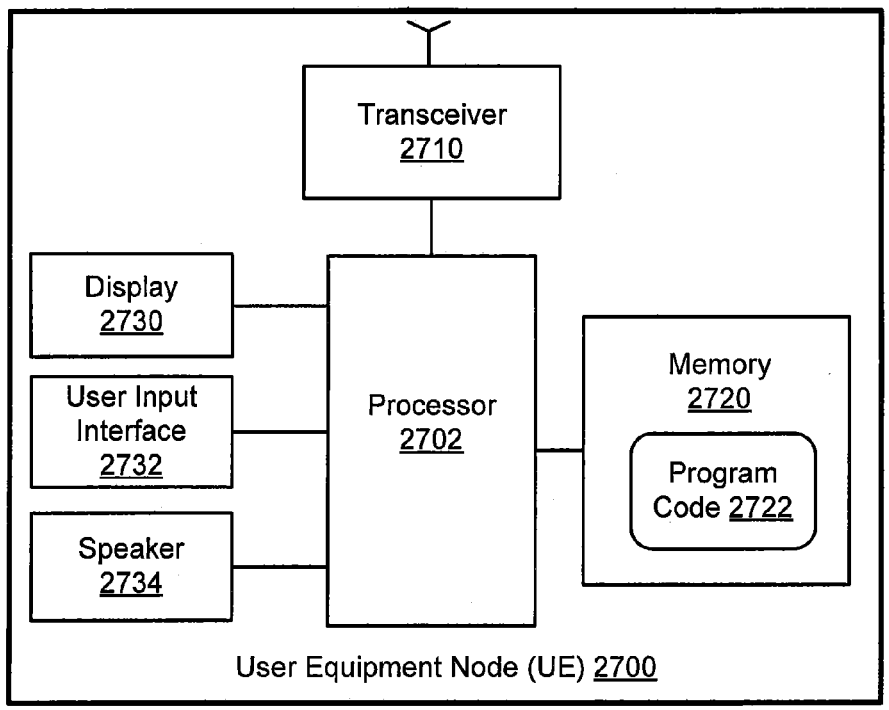
FIG. 27 is a block diagram of a UE according to some embodiments.

FIG. 27 is a block diagram of a UE 2700 that is configured to perform operations according to one or more embodiments disclosed herein. The UE 2700 includes at least one transceiver 2710, at least one processor 2702, and at least one memory 2720 containing program code 2722. The UE 2700 may further include a display 2730, a user input interface 2732, and a speaker 2734.

The transceiver 2710 is configured to communicate with a RAN node through a wireless air interface using one or more of the radio access technologies disclosed herein. The processor 2702 may include one or more data processing circuits, such as a general purpose and/or special purpose processor, e.g., microprocessor and/or digital signal processor. The processor 2702 is configured to execute computer program instructions of the program code 2722 stored in the memory 2720 to perform at least some of the operations described herein as being performed by a UE.

Figure 28:
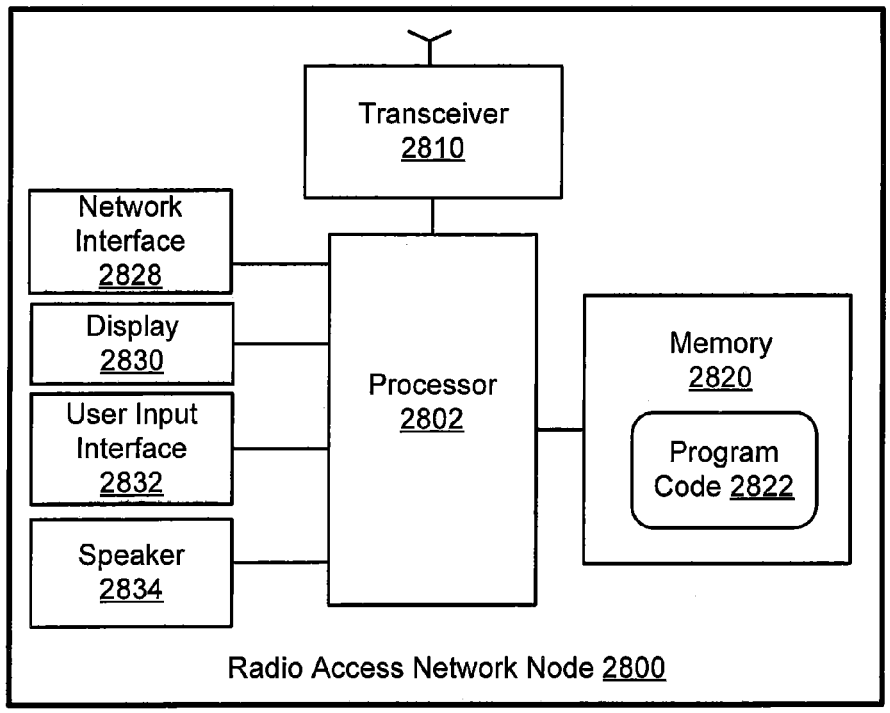
FIG. 28 is a block diagram of a RAN node according to some emobidments.

FIG. 28 is a block diagram of a RAN node 2800 that is configured according to one or more embodiments disclosed herein for a source RAN node (e.g., S-eNB), a target RAN node (e.g., T-eNB), and/or another RAN node. The RAN node 2800 can include at least one transceiver 2010, at least one network interface 2828, at least one processor 2802, and at least one memory 2820 containing program code 2822.

The transceiver 2810 is configured to communicate with the UE 2700 using one or more of the radio access technologies disclosed herein. The processor 2802 may include one or more data processing circuits, such as a general purpose and/or special purpose processor, e.g., microprocessor and/or digital signal processor, that may be collocated or distributed across one or more networks. The processor 2802 is configured to execute computer program instructions of the program code 2822 stored in the memory 2820 to perform at least some of the operations described herein as being performed by a RAN node. The network interface 2828 communicates with other RAN nodes and/or a core network.

Figure 29:
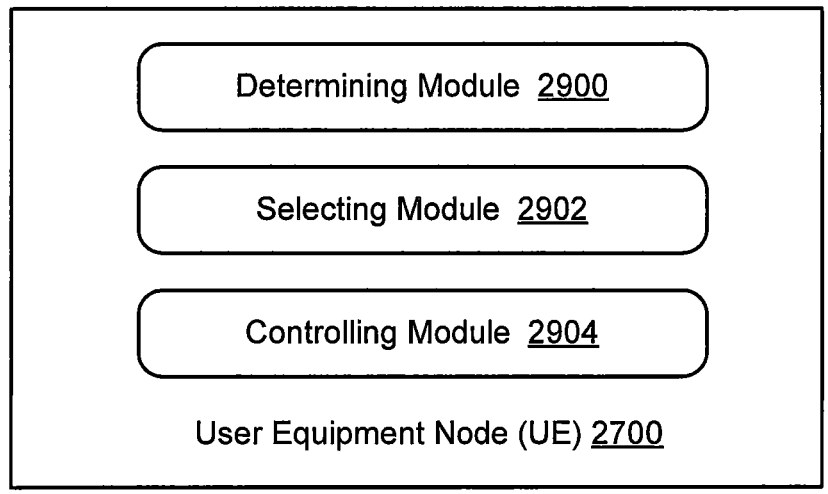
FIG. 29 is a block diagram of functional modules that may be implemented within a UE according to some embodiments.

FIG. 29 illustrates modules residing in the UE 2700 that perform operations as disclosed herein according to some embodiments. The UE 2700 includes a determining module 2900, a selecting module 2902, and a controlling module 2904. The determining module 2900 for determining whether a condition has occurred that can trigger initiation of handover to a T-RAN node. The selecting module 2902 is for, based on determining that the condition has not occurred, selecting among a plurality of service-specific DRX configurations based on a service type of the traffic from the S-RAN node, and controlling DRX by the UE of traffic from the S-RAN node based on the selected service-specific DRX configuration. The controlling module 2904 is for, based on determining that the condition has occurred, controlling DRX by the UE 2700 of traffic from the S-RAN node based on a service-agnostic DRX configuration that is agnostic to the service type of the traffic from the S-RAN node. The modules 2900, 2902, and 2904 may perform other operations disclosed herein with regard to FIGS. 14-22.

Figure 30:
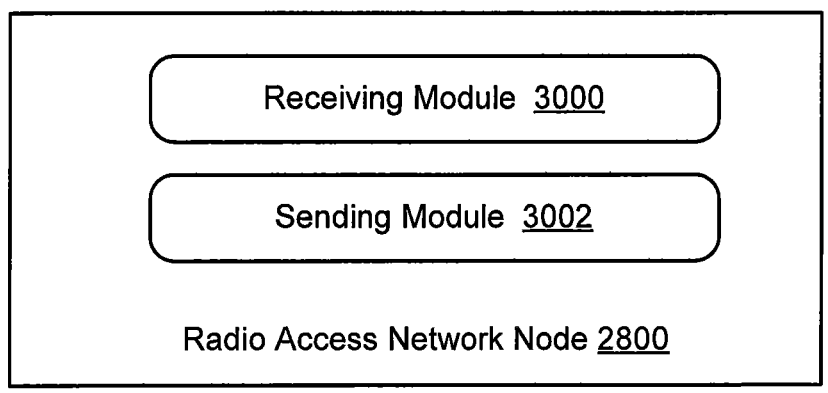
FIG. 30 is a block diagram of functional modules that may be implemented within a RAN node according to some embodiments.

FIG. 30 illustrates modules residing in the RAN node 2800 that perform operations as disclosed herein according to some embodiments. The RAN 2800 includes a receiving module 3000 for receiving a message from the UE 2700, and a sending module 3002 for, based on content of the message from the UE 2700, sending a message to the UE 2700 containing a request for the UE 2700 to suspend control of DRX which uses selections among a plurality of service-specific DRX configurations based on a service type of traffic from the S-RAN node, and for the UE 2700 to initiate control of DRX that will use a service-agnostic DRX configuration that is agnostic to the service type of the traffic from the S-RAN node. The modules 3000 and 3002 may perform other operations disclosed herein with regard to FIGS. 24-26.

ABBREVIATIONS

BSR Buffer Status Report (a MAC control element)
CBRA Contention Based Random Access
CFRA Contention Free Random Access
DC DRX configuration (index to such)
DL Downlink
DRX Discontinuous Reception
D-SR Dedicated SR
eNB evolution NodeB
F3 PUCCH Format 3
HO Handover
IE Information Element
KPI Key Performance Indicator
MAC Medium Access Control
NAS Non Access Stratum
OTT Over the Top
PC PUCCH Configuration (release that)
PDCCH Physical Downlink Control Channel
PFT Protocol Feature Testing
PMB Protocol Message Body
PMT Protocol Message Type
PUCCH Physical Uplink Control Channel
PUSCH Physical Uplink Shared Channel
RA-SR Random Access SR
RRC Radio Resource Control
S-eNB Source eNB
SL Side Link
SN Sequence Number
SR Scheduling Request
T-eNB Target eNB
TTI Transmission Time Interval
UE User Equipment node
UL-SCH Uplink Shared (a Transport Channel)
VoLTE Voice over LTE

FURTHER DEFINITIONS AND EMBODIMENTS

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method by a user equipment node (UE) for discontinuous reception (DRX) of traffic from a source radio access network (S-RAN) node of a telecommunications system, the method comprising:
   determining whether a condition has occurred that can trigger initiation of handover to a target RAN (T-RAN) node, wherein the condition corresponds to mobility events in which the UE starts or ceases to move out of coverage from the S-RAN node;
   based on determining that the condition has not occurred, selecting by the UE from among a plurality of service-specific DRX configurations stored in the UE and selected based on a service type of the traffic from the S-RAN node, and controlling DRX by the UE of traffic from the S-RAN node based on the selected service-specific DRX configuration;
   based on determining that the condition has occurred, controlling the DRX by the UE of traffic from the S-RAN node based on a service-agnostic DRX configuration that is stored in the UE and that is agnostic to the service type of the traffic from the S-RAN node, wherein controlling the DRX by the UE of traffic from the S-RAN node comprises suspending the selecting among the plurality of service-specific DRX configurations irrespective of any changes in a service type of the traffic from the S-RAN node; and
   based on determining that another condition has occurred based on completing handover to the T-RAN node, ceasing controlling the DRX by the UE based on the service-agnostic DRX configuration and resume selecting among a plurality of service-specific DRX configurations based on characteristics of traffic from the T-RAN node to use to control the DRX by the UE.

2. The method of claim 1, wherein the controlling the DRX by the UE of traffic from the S-RAN node based on the service-agnostic DRX configuration that is agnostic to the service type of the traffic from the S-RAN node, comprises:
   defining a drx-inactivity timer value based on the service-agnostic DRX configuration; and
   controlling duration of continuous reception by the UE based on the drx-inactivity timer value irrespective of whether a service type of the traffic from the S-RAN node changes while using the service-agnostic DRX configuration.

3. A method by a user equipment node (UE) for discontinuous reception (DRX) of traffic from a source radio access network (S-RAN) node of a telecommunications system, the method comprising:
   determining whether a condition has occurred that can trigger initiation of handover to a target RAN (T-RAN) node, wherein the condition corresponds to mobility events in which the UE starts or ceases to move out of coverage from the S-RAN node;
   based on determining that the condition has not occurred, selecting by the UE from among a plurality of service-specific DRX configurations stored in the UE and selected based on a service type of the traffic from the S-RAN node, and controlling DRX by the UE of traffic from the S-RAN node based on the selected service-specific DRX configuration;
   based on determining that the condition has occurred, controlling the DRX by the UE of traffic from the S-RAN node based on a service-agnostic DRX configuration that is stored in the UE and that is agnostic to the service type of the traffic from the S-RAN node, wherein controlling the DRX by the UE of traffic from the S-RAN node comprises suspending the selecting among the plurality of service-specific DRX configurations irrespective of any changes in a service type of the traffic from the S-RAN node; and
   based on determining that another condition has occurred that can trigger cessation of handover to the T-RAN node, ceasing controlling the DRX by the UE based on the service-agnostic DRX configuration and resuming controlling the DRX by the UE based on one of the plurality of service-specific DRX configurations based on characteristics of traffic from the S-RAN node.

4. The method of claim 1,
   wherein the determining that the condition has occurred comprises determining that the condition has occurred based on receiving a control message from the S-RAN node, the control message comprising DRX configuration data; and
   wherein the controlling the DRX by the UE of traffic from the S-RAN node based on the service-agnostic DRX configuration that is agnostic to the service type of the traffic from the S-RAN node, comprises,
   defining the service-agnostic DRX configuration based on the DRX configuration data.

5. The method of claim 4, wherein the controlling the DRX by the UE of traffic from the S-RAN node based on the service-agnostic DRX configuration comprises controlling duration of continuous reception by the UE based on a drx-inactivity timer value defined based on the DRX configuration data.

6. The method of claim 1, further comprising:
   determining whether an entering condition has occurred for triggering reporting of measurements to the S-RAN node; and
   based on determining that the entering condition has occurred, initiating reporting of measurements to the S-RAN node, wherein at least one of the reports comprises a request for the S-RAN node to suspend the UE's use of the service-specific DRX configurations, wherein the determining that the condition has occurred that can trigger initiation of handover to the T-RAN node, comprises
receiving a message from the S-RAN node controlling the UE to suspend the selecting among the plurality of service-specific DRX configurations irrespective of any changes in a service type of the traffic from the S-RAN node.

7. The method of claim 1, further comprising:
determining whether a leaving condition has occurred for ceasing reporting of measurements to the S-RAN node;
based on determining that the leaving condition has occurred, sending a control message to the S-RAN node indicating that the leaving condition has occurred and requesting the S-RAN node to resume the UE's use of the service-specific DRX configurations; and
based on receiving a message from the S-RAN node requesting resumption of the UE's use of the service-specific DRX configurations, ceasing the controlling DRX by the UE based on the service-agnostic DRX configuration and resuming controlling DRX by the UE based on one of the plurality of service-specific DRX configurations selected based on characteristics of traffic from the S-RAN node.

8. The method of claim 1, further comprising:
receiving a switch message via a medium access control protocol from the S-RAN node, the switch message comprising a request to suspend the UE's use of the service-specific DRX configurations; and
based on the request, suspending the UE's use of the service-specific DRX configurations for controlling DRX and initiating controlling the DRX by the UE of traffic from the S-RAN node based on the service-agnostic DRX configuration that is agnostic to the service type of the traffic from the S-RAN node.

9. The method of claim 1, wherein:
the determining whether the condition has occurred that can trigger initiation of handover to the T-RAN node, comprises,
determining whether an entering condition has occurred for triggering reporting of measurements to the S-RAN node; and
the controlling DRX by the UE of traffic from the S-RAN node, comprises,
controlling DRX by the UE of traffic from the S-RAN node using the service-agnostic DRX configuration, based on determining that the entering condition has occurred.

10. A method by a user equipment node (UE) for discontinuous reception (DRX) of traffic from a sour radio access network (S-RAN) node of a telecommunications system, the method comprising:
determining whether a condition has occurred that can trigger initiation of handover to a target RAN (T-RAN) node, wherein the condition corresponds to mobility events in which the UE starts or ceases to move out of coverage from the S-RAN node;
based on determining that the condition has not occurred, selecting by the UE from among a plurality of service-specific DRX configurations stored in the UE and selected based on a service type of the traffic from the S-RAN node, and controlling DRX by the UE of traffic from the S-RAN node based on the selected service-specific DRX configuration; and
based on determining that the condition has occurred and receiving a switch message via a medium access control protocol from the S-RAN node, the switch message comprising a request to suspend the UE's use of the service-specific DRX configurations, suspending the UE's use of the service-specific DRX configurations for controlling DRX and initiating controlling the DRX by the UE of traffic from the S-RAN node based on a service-agnostic DRX configuration that is stored in the UE and that is agnostic to the service type of the traffic from the S-RAN node, wherein controlling the DRX by the UE of traffic from the S-RAN node comprises suspending the selecting among the plurality of service-specific DRX configurations irrespective of any changes in a service type of the traffic from the S-RAN node,
wherein the determining whether the condition has occurred that can trigger initiation of handover to the T-RAN node, comprises:
determining whether an entering condition has occurred for triggering reporting of measurements to the S-RAN node; and
the controlling DRX by the UE of traffic from the S-RAN node, comprises, controlling DRX by the UE of traffic from the S-RAN node using the service-agnostic DRX configuration, based on determining that the entering condition has occurred;
determining whether a leaving condition has occurred for ceasing reporting of measurements to the S-RAN node; and
based on determining that the leaving condition has occurred, ceasing the controlling DRX by the UE using the service-agnostic DRX configuration and resuming control of DRX by the UE using one of the plurality of service-specific DRX configurations selected based on characteristics of traffic from the S-RAN node.

11. The method of claim 9, wherein:
the determining whether the entering condition has occurred for triggering reporting of measurements to the S-RAN node, comprises:
performing measurements on signals received from the S-RAN node; and
determining whether comparison of the measurements to a threshold value satisfies the entering condition; and
the controlling DRX by the UE of traffic from the S-RAN node based on determining that the condition has occurred, comprises,
controlling DRX by the UE of traffic from the S-RAN node using the service-agnostic DRX configuration, based on the comparison of the measurements to the threshold value satisfying the entering condition.

12. The method of claim 9, wherein:
the determining whether the entering condition has occurred for triggering reporting of measurements to the S-RAN node, comprises:
performing measurements on signals received from the S-RAN node;
performing measurements on signals received from the T-RAN node; and
determining whether comparison of the measurements on signals received from the S-RAN node to the measurements on signals received from the T-RAN node satisfies the entering condition; and
the controlling DRX by the UE of traffic from the S-RAN node based on determining that the condition has occurred, comprises,
controlling DRX by the UE of traffic from the S-RAN node using the service-agnostic DRX configuration, based on the comparison satisfying the entering condition.

13. The method of claim 9, wherein:
the determining whether the entering condition has occurred for triggering reporting of measurements to the S-RAN node, comprises:
performing measurements on signals received from the S-RAN node;
performing measurements on signals received from the T-RAN node; and
determining whether a first comparison of the measurements on signals received from the S-RAN node to a first threshold and a second comparison of the measurements on signals received from the T-RAN node to a second threshold satisfy the entering condition; and
the controlling DRX by the UE of traffic from the S-RAN node based on determining that the condition has occurred, comprises,
controlling DRX by the UE of traffic from the S-RAN node using the service-agnostic DRX configuration, based on the first and second comparisons satisfying the entering condition.

14. A user equipment node (UE) providing discontinuous reception (DRX) of traffic from a source radio access network (S-RAN) node of a telecommunications system, the UE comprising:
at least one processor; and
at least one memory coupled to the at least one processor and comprising computer readable program code embodied in the at least one memory that when executed by the at least one processor causes the at least one processor to perform operations comprising:
determining whether a condition has occurred that can trigger initiation of handover to a target RAN (T-RAN) node, wherein the condition corresponds to a movement of the UE toward an edge of a coverage area served by the S-RAN node;
based on determining that the condition has not occurred, selecting by the processor from among a plurality of service-specific DRX configurations stored in the at least one memory and selected based on a service type of the traffic from the S-RAN node, and controlling the DRX by the processor of traffic from the S-RAN node based on the selected service-specific DRX configuration;
based on determining that the condition has occurred, controlling the DRX by the processor of traffic from the S-RAN node based on a service-agnostic DRX configuration that is stored in the at least one memory and that is agnostic to the service type of the traffic from the S-RAN node,
wherein the controlling the DRX by the processor of traffic from the S-RAN node based on the service-agnostic DRX configuration that is agnostic to the service type of the traffic from the S-RAN node, comprises:
suspending the selecting among the plurality of service-specific DRX configurations irrespective of any changes in a service type of the traffic from the S-RAN node; and
based on determining that another condition has occurred based on completing handover to the T-RAN node, ceasing controlling the DRX by the UE based on the service-agnostic DRX configuration and resume selecting among a plurality of service-specific DRX configurations based on characteristics of traffic from the T-RAN node to use to control the DRX by the UE.

15. A method by a source radio access network (S-RAN) node of a telecommunications system for controlling discontinuous reception (DRX) by a user equipment node (UE) of traffic from the S-RAN node, the method comprising:
receiving a message from the UE indicating that a condition has occurred that corresponds to a movement of the UE toward an edge of a coverage area served by the S-RAN node; and
based on content of the message from the UE, sending a message to the UE containing a request for the UE to suspend control of DRX which uses selections among a plurality of service-specific DRX configurations based on a service type of traffic from the S-RAN node, and for the UE to initiate control of DRX that will use a service-agnostic DRX configuration that is agnostic to the service type of the traffic from the S-RAN node,
wherein sending the message to the UE comprising the request comprises:
determining that the message received from the UE comprises a request for the S-RAN node to suspend the UE's use of the service-specific DRX configurations; and
based on the request, sending the message to the UE containing the request for the UE to suspend control of DRX which uses selections among the plurality of service-specific DRX configurations, and for the UE to initiate control of DRX that will use the service-agnostic DRX configuration,
wherein control of the DRX by the UE of traffic from the S-RAN node based on the service-agnostic DRX configuration that is agnostic to the service type of the traffic from the S-RAN node comprises a request for the UE to suspend using selections among the plurality of service-specific DRX configurations irrespective of any changes in a service type of the traffic from the S-RAN node.

16. The method of claim 15, wherein the sending the message to the UE containing the request, comprises:
sending the message to the UE based on determining that the message received from the UE contains an indication that an entering condition has occurred for triggering reporting of measurements in measurement reports to the S-RAN node.

17. The method of claim 16, further comprising:
determining that another message received from the UE comprises an indication that a leaving condition has occurred for ceasing the reporting of measurements in measurement reports to the S-RAN node; and
based on determining that the leaving condition has occurred, sending another message to the UE containing a request for the UE to cease control of DRX which uses the service-agnostic DRX configuration and to resume control of the DRX which uses selections among the plurality of service-specific DRX configurations based on a service type of traffic from the S-RAN node.

18. The method of claim 16, wherein the message received from the UE comprises a measurement report, and wherein the step of sending the message to the UE comprising the request, comprises:
sending the message to the UE based on determining that the measurement report comprises a measurement of signals received by the UE that satisfies a condition for initiating handover of the UE to a target RAN, T-RAN, node.

19. The method of claim 15, wherein the message sent to the UE comprising the request, comprises DRX configuration data that the UE uses to determine the service-agnostic DRX configuration.

20. A source radio access network (S-RAN) node of a telecommunications system for controlling discontinuous reception (DRX) by a user equipment node (UE) of traffic from the S-RAN node, the S-RAN node comprising:

at least one processor; and at least one memory coupled to the at least one processor and comprising computer readable program code embodied in the at least one memory that when executed by the at least one processor causes the at least one processor to perform operations comprising:

receiving a message from the UE indicating a movement of the UE toward an edge of a coverage area served by the S-RAN node; and based on content of the message from the UE, sending a message to the UE comprising a request for the UE to suspend control of DRX which uses selections among a plurality of service-specific DRX configurations irrespective of any changes in a service type of the traffic from the S-RAN node, and for the UE to initiate control of DRX that will use a service-agnostic DRX configuration that is agnostic to the service type of the traffic from the S-RAN node, wherein sending the message to the UE comprising the request comprises:

determining that the message received from the UE comprises a request for the S-RAN node to suspend the UE's use of the service-specific DRX configurations; and based on the request, sending the message to the UE containing the request for the UE to suspend control of DRX which uses selections among the plurality of service-specific DRX configurations, and for the UE to initiate control of DRX that will use the service-agnostic DRX configuration.

* * * * *